(12) United States Patent
Fukuda et al.

(10) Patent No.: US 8,244,107 B2
(45) Date of Patent: Aug. 14, 2012

(54) DATA PROCESSING APPARATUS

(75) Inventors: Hideki Fukuda, Nara (JP); Kojiro Kawasaki, Katano (JP)

(73) Assignee: Panasonic Corporation, Osaka (JP)

( * ) Notice: Subject to any disclaimer, the term of this patent is extended or adjusted under 35 U.S.C. 154(b) by 935 days.

(21) Appl. No.: 10/544,969

(22) PCT Filed: Feb. 12, 2004

(86) PCT No.: PCT/JP2004/001506
§ 371 (c)(1),
(2), (4) Date: Jan. 23, 2006

(87) PCT Pub. No.: WO2004/073305
PCT Pub. Date: Aug. 26, 2004

(65) Prior Publication Data
US 2006/0171684 A1    Aug. 3, 2006

(30) Foreign Application Priority Data

Feb. 13, 2003   (JP) ................. 2003-034841
Feb. 13, 2003   (JP) ................. 2003-034842
Feb. 13, 2003   (JP) ................. 2003-034843

(51) Int. Cl.
*H04N 5/92* (2006.01)
(52) U.S. Cl. ...................... 386/326; 386/239
(58) Field of Classification Search ............... 386/1, 46, 386/109, 112, 124–126
See application file for complete search history.

(56) References Cited

U.S. PATENT DOCUMENTS

| | | | |
|---|---|---|---|
| 5,497,239 A | 3/1996 | Kwon | |
| 6,577,811 B1 * | 6/2003 | Kikuchi et al. | 386/246 |
| 6,584,272 B1 | 6/2003 | Fukushima et al. | 386/46 |
| 6,671,454 B1 * | 12/2003 | Kaneko et al. | 386/291 |
| 7,212,725 B2 * | 5/2007 | Gunji et a | 386/243 |
| 2002/0054754 A1 * | 5/2002 | Kikuchi et al. | 386/83 |

(Continued)

FOREIGN PATENT DOCUMENTS

CN    1241780 A    1/2000

(Continued)

OTHER PUBLICATIONS

Office Action dated Mar. 7, 2008 issued for the corresponding Chinese Patent Application No. 200480001840.4 and partial English translation thereof.

(Continued)

*Primary Examiner* — William C Vaughn, Jr.
*Assistant Examiner* — Eileen Adams
(74) *Attorney, Agent, or Firm* — Renner, Otto, Boisselle & Sklar, LLP

(57) ABSTRACT

A data processing apparatus includes: a receiving section for receiving a signal concerning program data; a determination section for determining a type of a storage medium having been loaded; a recording processing section for recording program data obtained from the signal onto the storage medium, via one of a stream recording process and an encode recording process a selection section for selecting one of the recording processes in accordance with a type of the storage medium; and a calculation section for, in accordance with the selected recording process, selecting one of: a first remaining amount calculation process based on a remaining capacity of the storage medium and on a transmission rate of the program data; and a second remaining amount calculation process based on an encoding rate, and for calculating a remaining duration for which it is possible to perform recording on the storage medium.

22 Claims, 26 Drawing Sheets

U.S. PATENT DOCUMENTS

| | | |
|---|---|---|
| 2000/0159751 | 10/2002 | Moteki et al. |
| 2003/0103763 A1* | 6/2003 | Sugimura et al. ............... 386/65 |

FOREIGN PATENT DOCUMENTS

| | | |
|---|---|---|
| EP | 1 168 347 | 1/2002 |
| JP | 7-23339 | 1/1995 |
| JP | 08-235670 | 9/1996 |
| JP | 11-112897 | 9/1996 |
| JP | 11-205729 | 7/1999 |
| JP | 11-328937 | 11/1999 |
| JP | 2000-287173 | 10/2000 |
| JP | 2001-036861 | 2/2001 |
| JP | 2002-152657 | 5/2002 |
| JP | 2002-222586 | 8/2002 |
| JP | 2002-313067 | 10/2002 |
| JP | 2002-330401 | 11/2002 |
| JP | 2002-374498 | 12/2002 |
| JP | 2003-324684 | 11/2003 |

OTHER PUBLICATIONS

International Search Report for corresponding PCT/JP2004/001506, mailed Jun. 1, 2004.

Extended European Search Report for corresponding European application No. 04710542.4 dated Oct. 30, 2009.

* cited by examiner

FIG. 4

| Input Signal Type | Medium Type | Recording Process Type | Remaining Amount Calculation Process Type | Control Type |
|---|---|---|---|---|
| Digital Stream Signal | Ultrahigh Density RAM | Stream Recording | Remaining Amount Calculation Process (1) | Capacity-Base |
| | DVD—RAM | PS Re-Encode Recording | Remaining Amount Calculation Process (3) | Time-Base |
| Analog Television Signal | Ultrahigh Density RAM | TS Self-Encode Recording | Remaining Amount Calculation Process (2) | Capacity-Base |
| | DVD—RAM | PS Self-Encode Recording | Remaining Amount Calculation Process (3) | Time-Base |

419

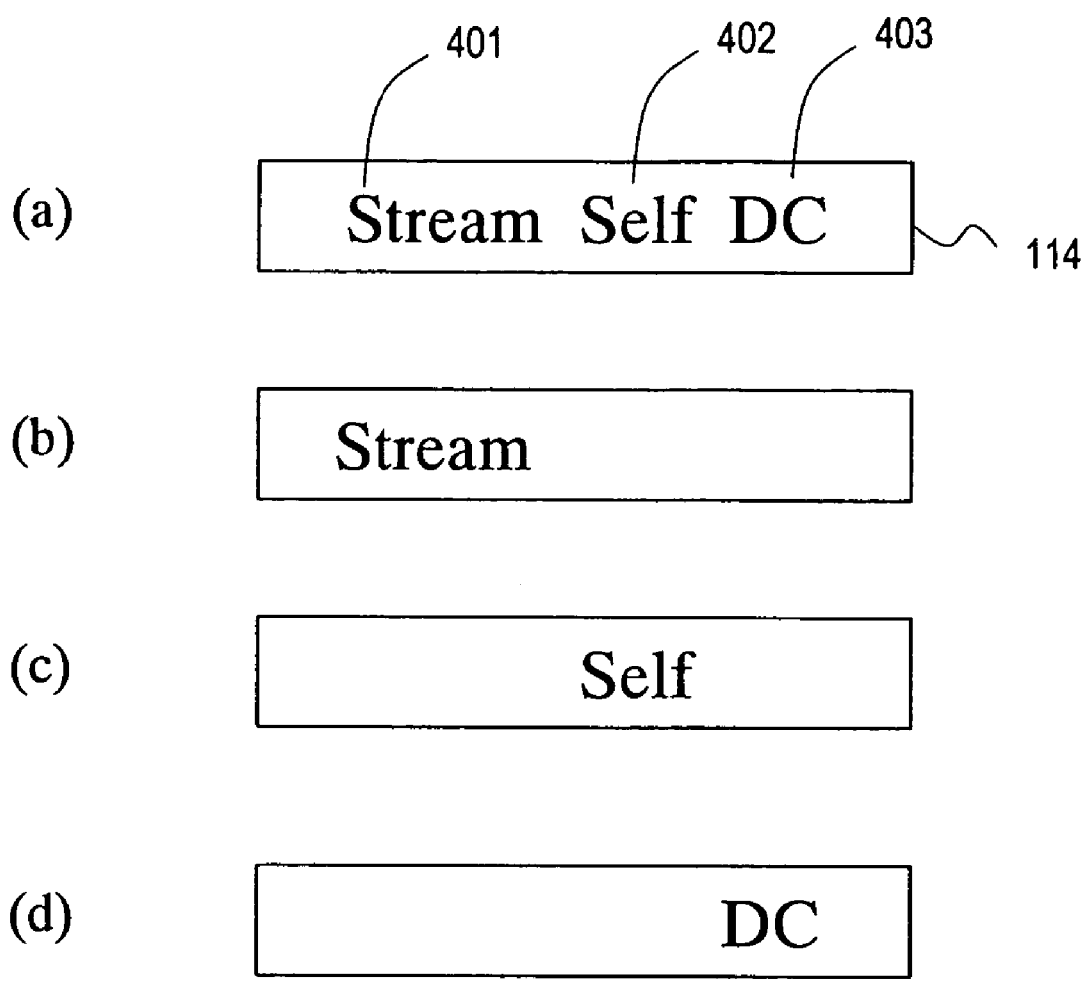

| Program | Start Time | Data Rate |
|---------|------------|-----------|
| Program a | T(a) | R(a) |
| Program b | T(b) | R(b) |
| Program c | T(c) | R(c) |
| Program d | T(d) | R(d) |

| Videorecording Mode | Input Signal Type | Medium Type | Recording Process Type |
|---|---|---|---|
| Auto mode | Digital Stream Signal | Ultrahigh Density RAM | Stream Recording |
| | | DVD-RAM | PS Re-Encode Recording |
| | Analog Television Signal | Ultrahigh Density RAM | TS Self-Encode Recording |
| | | DVD-RAM | PS Self-Encode Recording |
| Manual Mode | Digital Stream Signal | Ultrahigh Density RAM | TS Re-Encode Recording |
| | | DVD-RAM | PS Re-Encode Recording |
| | Analog Television Signal | Ultrahigh Density RAM | TS Self-Encode Recording |
| | | DVD-RAM | PS Self-Encode Recording |

419

FIG.20
(a) 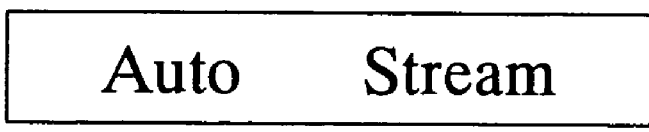 114
(b) 
(c) 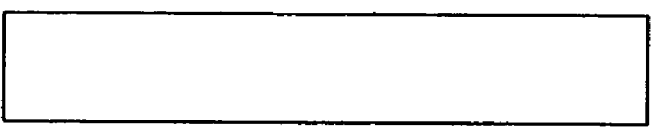

FIG.21

(a) | Auto  B-XP  SP  LP | ~ 114

(b) | Auto |

(c) | Auto          SP |

| Inserted Medium | Input Source | | Recording Rate Used For Remaining Amount Calculation | Remaining Amount Calculation Type |
|---|---|---|---|---|
| Ultrahigh Density RAM Medium | BS Digital | HD Broadcast | 24Mbps | Remaining Amount Calculation (1) |
| | | SD Broadcast | 12Mbps | |
| | Terrestrial Digital | HD Broadcast | 18Mbps | |
| | | SD Broadcast | 9Mbps | |
| | Analog | | 5Mbps | Remaining Amount Calculation (2) |
| DVD Medium | BS Digital Terrestrial Digital Analog | | 5Mbps | Remaining Amount Calculation (3) |

| Inserted Medium | Input Source | Recording Rate Used For Remaining Amount Calculation | Remaining Amount Calculation Type |
|---|---|---|---|
| Ultrahigh Density RAM Medium | BS Digital Terrestrial Digital Analog | 15Mbps | Remaining Amount Calculation (2) |
| DVD Medium | BS Digital Terrestrial Digital Analog | 10Mbps | Remaining Amount Calculation (3) |

| Inserted Medium | Input Source | Recording Rate Used For Remaining Amount Calculation | Remaining Amount Calculation Type |
|---|---|---|---|
| Ultrahigh Density RAM Medium | BS Digital Terrestrial Digital Analog | 10Mbps | Remaining Amount Calculation (2) |
| DVD Medium | BS Digital Terrestrial Digital Analog | 10Mbps | Remaining Amount Calculation (3) |

FIG.25

| Inserted Medium | Input Source | Recording Rate Used For Remaining Amount Calculation | Remaining Amount Calculation Type |
|---|---|---|---|
| Ultrahigh Density RAM Medium | BS Digital<br>Terrestrial Digital<br>Analog | 5Mbps | Remaining Amount Calculation (2) |
| DVD Medium | BS Digital<br>Terrestrial Digital<br>Analog | 5Mbps | Remaining Amount Calculation (3) |

FIG.26

| Inserted Medium | Input Source | Recording Rate Used For Remaining Amount Calculation | Remaining Amount Calculation Type |
|---|---|---|---|
| Ultrahigh Density RAM Medium | BS Digital<br>Terrestrial Digital<br>Analog | 2.5Mbps | Remaining Amount Calculation (2) |
| DVD Medium | BS Digital<br>Terrestrial Digital<br>Analog | 2.5Mbps | Remaining Amount Calculation (3) |

FIG.27

| Inserted Medium | Input Source | Operation | Display Pattern | |
|---|---|---|---|---|
| Uninserted | BS Digital Terrestrial Digital Analog | Stopped | Auto | |
| Ultrahigh Density RAM Medium | BS Digital Terrestrial Digital | Stopped | Auto | |
| | | Videorecording | | |
| | | Reproducing | | |
| | Analog | Stopped | Auto | |
| | | Videorecording | Auto | SP |
| | | Reproducing | | SP |
| DVD Medium | BS Digital Terrestrial Digital | Stopped | Auto | |
| | | Videorecording | Auto | SP |
| | | Reproducing | | SP |
| | Analog | Stopped | Auto | |
| | | Videorecording | Auto | SP |
| | | Reproducing | | SP |

FIG.28

| Inserted Medium | Input Source | Operation | Display Pattern |
|---|---|---|---|
| Uninserted | BS Digital Terrestrial Digital Analog | Stopped | B-XP |
| Ultrahigh Density RAM Medium | BS Digital Terrestrial Digital Analog | Stopped | B-XP |
| | | Videorecording | |
| | | Reproducing | |
| DVD Medium | BS Digital Terrestrial Digital Analog | Stopped | B-XP |
| | | Videorecording | XP |
| | | Reproducing | |

FIG.29

| Inserted Medium | Input Source | Operation | Display Pattern |
|---|---|---|---|
| Uninserted | BS Digital Terrestrial Digital Analog | Stopped | XP |
| Ultrahigh Density RAM Medium | BS Digital Terrestrial Digital Analog | Stopped | |
| | | Videorecording | |
| | | Reproducing | |
| DVD Medium | BS Digital Terrestrial Digital Analog | Stopped | |
| | | Videorecording | |
| | | Reproducing | |

FIG.30

| Inserted Medium | Input Source | Operation | Display Pattern |
|---|---|---|---|
| Uninserted | BS Digital Terrestrial Digital Analog | Stopped | SP |
| Ultrahigh Density RAM Medium | BS Digital Terrestrial Digital Analog | Stopped | |
| | | Videorecording | |
| | | Reproducing | |
| DVD Medium | BS Digital Terrestrial Digital Analog | Stopped | |
| | | Videorecording | |
| | | Reproducing | |

FIG.31

| Inserted Medium | Input Source | Operation | Display Pattern |
|---|---|---|---|
| Uninserted | BS Digital Terrestrial Digital Analog | Stopped | LP |
| Ultrahigh Density RAM Medium | BS Digital Terrestrial Digital Analog | Stopped | |
| | | Videorecording | |
| | | Reproducing | |
| DVD Medium | BS Digital Terrestrial Digital Analog | Stopped | |
| | | Videorecording | |
| | | Reproducing | |

*FIG.32*
(a) 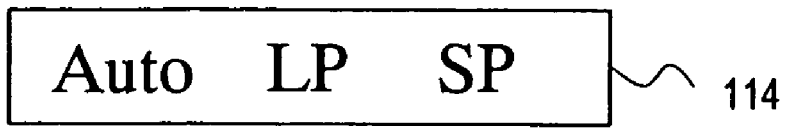 114
(b) 
(c) 
(d) 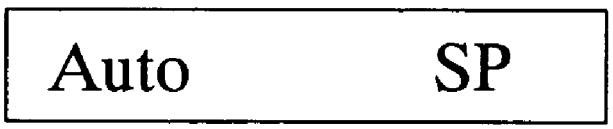
(e) 
(f) 

FIG.33

(a) | Auto  Stream  LP  SP | ~ 114

(b) | Auto  Stream |

(c) | Auto            LP |

(d) | Auto                    SP |

(e) |                    LP |

(f) |                        SP |

DATA PROCESSING APPARATUS

TECHNICAL FIELD

The present invention relates to an apparatus which is capable of recording onto a storage medium a plurality of types of input signals, e.g., an analog television signal, a digital television signal, and the like.

BACKGROUND ART

Conventionally, there are known apparatuses which have a plurality of recording processing paths, and which perform recording by selecting a particular path when recording a video signal onto a storage medium. For example, a recording apparatus described in Japanese Laid-Open Patent Publication No. 7-23339 (data processing apparatus) receives a video signal in a digital stream, and record the signal on a storage medium by selecting an appropriate mode (recording processing path) from among: videorecording mode 1, under which the signal is directly recorded onto a storage medium; videorecording mode 2, under which the digital stream is decoded and thereafter recorded; and videorecording mode 3, under which the digital stream is decoded, and thereafter subjected to an intra-mode compression encoding and recorded.

When recording a video signal onto a storage medium, it is sometimes the case that a remaining duration for which recording is possible is calculated. This calculation is generally performed by dividing the remaining capacity of the storage medium by a recording rate. For example, a recording apparatus described in Japanese Laid-Open Patent Publication No. 11-328937, in the case where a compression encoding is performed with a variable bit rate (i.e., the recording rate varies), ascertains the remaining duration based on a current compression bit rate and remaining capacity, and displays the remaining duration. Japanese Laid-Open Patent Publication No. 11-112897 discloses a technique which detects a data amount or data rate based on program information which is transmitted along with the video/audio data, and judges whether it is possible to perform recording on a storage medium or not.

As a video compression encoding scheme used in a digital broadcast and used in recording onto a DVD, an MPEG encoding scheme is generally used. For example, in a BS digital broadcast, a video signal is transmitted in the form of a well-known MPEG transport stream, and recorded onto a Blu-ray disc (BD) by using a blue-violet laser. Moreover, a video signal is recorded onto a DVD in the form of a well-known MPEG program stream. In such MPEG streams, encoded streams which have been obtained by compression encoding subjecting information such as video and audio to a compression encoding are multiplexed. However, bit rates of the video and audio signals vary depending on the qualities of the video and audio, respectively.

In a conventional recording apparatus, although different recording methods are used depending on the type of input signal and the type of storage medium, the recording apparatus calculates a remaining duration by using a fixed data rate which has previously been determined, regardless of the recording method. Therefore, it has been impossible to determine an accurate remaining duration. For example, in a mode of directly recording a digital stream (stream recording), the data rate may vary, so that it is impossible to accurately calculate a remaining duration with a fixed data rate. Moreover, in a stream recording, the recording apparatus cannot control the data rate of the data stream; therefore, if the data is erased later, it is impossible to guarantee a recording for a duration corresponding to the erased duration. Therefore, there also exists a problem in that an accurate remaining duration cannot be obtained if the remaining duration after an erasure is calculated by the same method.

The present invention has been made in view of the aforementioned problems, and an objective thereof is to determine a recording method based on a type of input signal and a type of storage medium, as well as to determine a remaining amount calculation method which is in accordance with the recording method, and calculate an accurate remaining duration.

DISCLOSURE OF INVENTION

A data processing apparatus according to the present invention is capable of writing and/or reading program data from or to a plurality of types of storage media. The data processing apparatus includes: a receiving section for receiving a signal concerning program data; a determination section for determining a type of a storage medium having been loaded; a recording processing section for recording program data obtained from the signal onto the storage medium, via one of the processes of: a stream recording process, in which the program data is neither decoded nor encoded; and an encode recording process, in which the program data is at least encoded; a selection section for selecting one of the stream recording process and the encode recording process in accordance with a type of the storage medium; a calculation section for, in accordance with the selected recording process, selecting one of: a first remaining amount calculation process which is based on a remaining capacity of the storage medium and on a transmission rate of the program data; and a second remaining amount calculation process which is based on an encoding rate, and for calculating, by the selected calculation process, a remaining duration for which it is possible to perform recording on the storage medium; and a display section for displaying the calculated remaining duration.

The storage media may be differentiated in type depending on recording capacity; the receiving section may receive one of the signals of a digital signal and an analog signal; the recording processing section may select the encode recording process for any storage medium having a recording capacity equal to or lees than a predetermined reference capacity; and the calculation section may select a second remaining amount calculation process.

The encode recording process may include a first encode recording process of subjecting the program data to a decoding and thereafter an encoding process and a second encode recording process of subjecting the program data to an encoding process; the recording processing section may select the first encode recording process when the receiving section receives the digital signal, and selects the second encode recording process when the receiving section receives the analog signal; and the calculation section may calculate the remaining duration by performing the second remaining amount calculation process based further on a recording rate and on a recorded duration representing an amount of time for which a recording process has been performed.

A memory for storing a reference recording duration may be further included, the reference recording duration representing a maximum duration for which the program data can be recorded on the unused storage medium, wherein, the calculation section may calculate a reference recorded duration by normalizing the recorded duration with the recording rate, determine a reference remaining duration by subtracting the reference recorded duration from the reference recording duration stored in the memory, and calculate the remaining duration based on the reference remaining duration and on the encoding rate.

The storage media may be differentiated in type depending on recording capacity; the receiving section may receive a digital signal; the recording processing section may select the stream recording process for any storage medium having a recording capacity equal to or greater than a predetermined reference capacity; and the calculation section may select the first remaining amount calculation process.

The signal may include program information specifying a transmission rate and a broadcasting duration of the program data, the data processing apparatus further including a controller for extracting the program information from the received signal, wherein the calculation section may calculate the remaining duration based on the extracted transmission rate and broadcasting duration.

The calculation section may calculate a data amount of each of one or more program data based on the transmission rate and broadcasting duration, determine a cumulative data amount obtained by cumulatively adding each data amount until exceeding the remaining capacity, and determining a cumulative broadcasting duration obtained by cumulatively adding each broadcasting duration corresponding to the added data amount, and determine the remaining duration by subtracting a broadcasting duration corresponding to any data amount exceeding the remaining capacity from the cumulative broadcasting duration.

The storage media may be differentiated in type depending on recording capacity; the receiving section may receive an analog signal; the recording processing section may select the encode recording process for any storage medium having a recording capacity equal to or greater than a predetermined reference capacity; and the calculation section may calculate the remaining duration by performing the second remaining amount calculation process based further on the remaining capacity of the storage medium.

The display section may further display information identifying the recording process selected by the recording processing section.

The display section may display at least one of the encoding rate, a resolution, and a frequency if the encode recording process is selected by the recording processing section.

A data processing method is capable of writing and/or reading program data from or to a plurality of types of storage media. The data processing method includes the steps of: receiving a signal concerning program data; determining a type of a storage medium having been loaded; recording program data obtained from the signal onto the storage medium, via one of the processes of: a stream recording process, in which the program data is neither decoded nor encoded; and an encode recording process, in which the program data is at least encoded; selecting one of the stream recording process and the encode recording process in accordance with a type of the storage medium; in accordance with the selected recording process, selecting one of: a first remaining amount calculation process which is based on a remaining capacity of the storage medium and on a transmission rate of the program data; and a second remaining amount calculation process which is based on an encoding rate, and for calculating, by the selected calculation process, a remaining duration for which it is possible to perform recording on the storage medium; and displaying the calculated remaining duration.

The storage media may be differentiated in type depending on recording capacity; the receiving step may receive one of the signals of a digital signal and an analog signal; the recording step may select the encode recording process for any storage medium having a recording capacity equal to or lees than a predetermined reference capacity; and the calculating step may select a second remaining amount calculation process.

The encode recording process may include a first encode recording process of subjecting the program data to a decoding and thereafter an encoding process and a second encode recording process of subjecting the program data to an encoding process; the recording step may select the first encode recording process when the receiving section receives the digital signal, and selects the second encode recording process when the receiving section receives the analog signal; and the calculating step may calculate the remaining duration by performing the second remaining amount calculation process based further on a recording rate and on a recorded duration representing an amount of time for which a recording process has been performed.

A step of storing, a reference recording duration may be further included, the reference recording duration representing a maximum duration for which the program data can be recorded on the unused storage medium, wherein, the calculating step may calculate a reference recorded duration by normalizing the recorded duration with the recording rate, determine a reference remaining duration by subtracting the reference recorded duration from the reference recording duration stored in the memory, and calculate the remaining duration based on the reference remaining duration and on the encoding rate.

The storage media may be differentiated in type depending on recording capacity; the receiving step may receive a digital signal; the recording step may select the stream recording process for any storage medium having a recording capacity equal to or greater than a predetermined reference capacity; and the calculating step may select the first remaining amount calculation process.

The signal may include program information specifying a transmission rate and a broadcasting duration of the program data, the data processing method further including a step of extracting the program information from the received signal, wherein the calculating step may calculate the remaining duration based on the extracted transmission rate and broadcasting duration.

The calculating step may calculate a data amount of each of one or more program data based on the transmission rate and broadcasting duration, determine a cumulative data amount obtained by cumulatively adding each data amount until exceeding the remaining capacity, and determining a cumulative broadcasting duration obtained by cumulatively adding each broadcasting duration corresponding to the added data amount, and determine the remaining duration by subtracting a broadcasting duration corresponding to any data amount exceeding the remaining capacity from the cumulative broadcasting duration.

The storage media may be differentiated in type depending on recording capacity; the receiving step may receive an analog signal; the recording step may select the encode recording process for any storage medium having a recording capacity equal to or greater than a predetermined reference capacity; and the calculating step may calculate the remaining duration by performing the second remaining amount calculation process based further on the remaining capacity of the storage medium.

The displaying step may further display information identifying the recording process selected by the recording processing section.

The displaying step may display at least one of the encoding rate, a resolution, and a frequency if the encode recording process is selected by the recording processing section.

A computer program according to the present invention is to be executed in a computer of a data processing apparatus for writing and/or reading program data from or to a plurality of types of storage media. The conversion method which the computer executes in accordance with the program includes the steps of: receiving a signal concerning program data; determining a type of a storage medium having been loaded; recording program data obtained from the signal onto the storage medium, via one of the processes of: a stream recording process, in which the program data is neither decoded nor encoded; and an encode recording process, in which the program data is at least encoded; selecting one of the stream recording process and the encode recording process in accordance with a type of the storage medium; in accordance with the selected recording process, selecting one of: a first remaining amount calculation process which is based on a remaining capacity of the storage medium and on a transmission rate of the program data; and a second remaining amount calculation process which is based on an encoding rate, and for calculating, by the selected calculation process, a remaining duration for which it is possible to perform recording on the storage medium; and displaying the calculated remaining duration.

BRIEF DESCRIPTION OF DRAWINGS

FIG. 4 is a diagram showing an example of a control table.

FIG. 5(a) is a diagram showing examples of text characters which can be displayed on a display section 114.

FIGS. 5(b) to (d) are diagrams showing examples of display patterns.

FIG. 18 is a diagram showing an exemplary control table.

FIGS. 20(a) to (c) are diagrams showing examples of display patterns on a display section 114 having a videorecording mode displaying function.

FIG. 21(a) is a diagram showing examples of display tubes in the display section 114.

FIGS. 21(b) to (g) are diagrams showing display states which may be taken by the display section 114.

FIG. 22 is a diagram showing a control table under an auto mode.

FIG. 23 is a diagram showing a control table under a BXP mode.

FIG. 24 is a diagram showing a control table under an XP mode.

FIG. 25 is a diagram showing a control table under an SP mode.

FIG. 26 is a diagram showing a control table under an LP mode.

FIG. 27 is a diagram showing a display pattern on the display section 114 in accordance with the type of the storage medium 112, type of the input source, and the like, under the auto mode.

FIG. 28 is a diagram showing a display pattern on the display section 114 in accordance with the type of the storage medium 112, type of the input source, and the like, under the BXP mode.

FIG. 29 is a diagram showing a display pattern on the display section 114 in accordance with the type of the storage medium 112, type of the input source, and the like, under the XP mode.

FIG. 30 is a diagram showing a display pattern on the display section 114 in accordance with the type of the storage medium 112, type of the input source, and the like, under the SP mode.

FIG. 31 is a diagram showing a display pattern on the display section 114 in accordance with the type of the storage medium 112, type of the input source, and the like, under the LP mode.

FIG. 32(a) is a diagram showing examples of text characters which can be displayed on the display section 114.

FIGS. 32(b) to (f) are diagrams showing display patterns on the display section 114.

FIG. 33(a) is a diagram showing examples of text characters which can be displayed on the display section 114.

FIGS. 33(b) to (f) are diagrams showing examples of text characters which can be displayed on the display section 114.

BEST MODE FOR CARRYING OUT THE INVENTION

Embodiment 1

Figure 1:
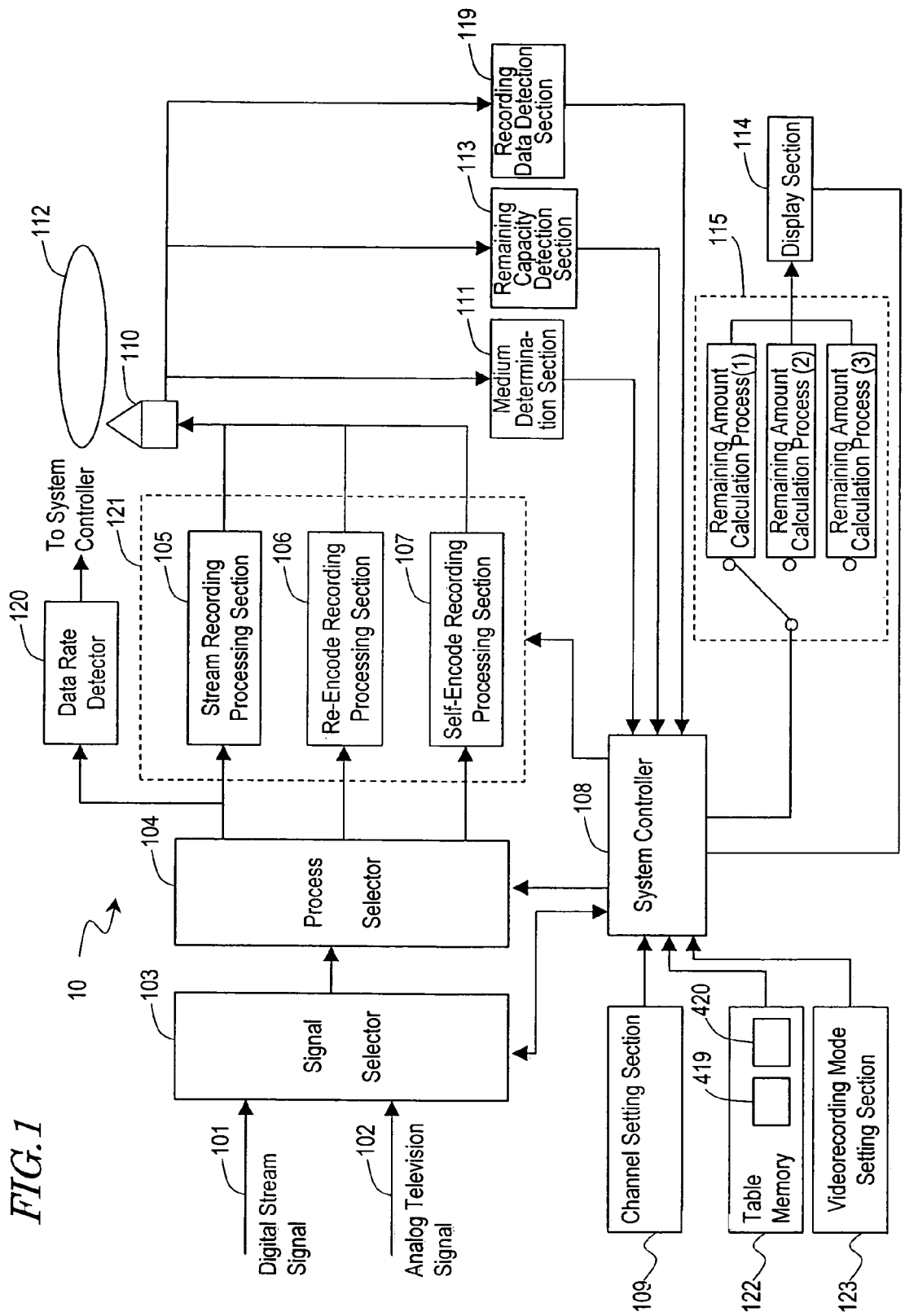
FIG. 1 is a diagram showing the constitution of functional blocks in a data processing apparatus 10 according to Embodiment 1.

FIG. 1 shows the constitution of functional blocks in a data processing apparatus 10 according to the present embodiment. For a plurality of types of storage media having different recording capacities, the data processing apparatus 10 is capable of writing and/or reading program data which is obtained based on a digital stream signal or an analog television signal.

The plurality of types of storage media may be, for example: a DVD-RAM medium which has a recording capacity of 4.7 Gbytes and for which recording is performed with a recording rate of 22 Mbps; an ultrahigh density RAM medium which has a recording capacity of 23 Gbytes and for which recording is performed with 33 Mbps, e.g., a Blu-ray disc (BD); a hard disk which has a capacity of tens of Gbytes to hundreds of Gbytes or more; and the like. The ultrahigh density RAM medium may be used with a laser having shorter wavelength than that of a blue laser or the like, and retains data based on marks, pits, and the like on the medium.

In accordance with the type of the storage medium 112 and the type of the input signal, the data processing apparatus 10 is capable of recording data by selecting one recording process from among a plurality of recording processes featuring different recording rates, encoding methods, and the like. Furthermore, in accordance with the selected recording process, the data processing apparatus 10 is capable of determining a remaining duration for which it is possible to perform recording for the storage medium 112 (hereinafter simply referred to as the "remaining duration") by selecting from among a plurality of remaining amount calculation processes. The reason for requiring a plurality of remaining amount calculation processes is that the remaining duration of the storage medium 112 will differ depending on the recording process. The calculated remaining duration is displayed in a manner to allow confirmation by a user, or is made available to the data processing apparatus 10 for a later recording operation.

Although the storage medium 112 is illustrated in FIG. 1, the storage medium 112 would be constituent element of the data processing apparatus 10 if the storage medium 112 is a hard disk, and would not be a constituent element of the data processing apparatus 10 if the storage medium 112 is a removable storage medium such as an optical disk. In the following descriptions, it is assumed that the storage medium 112 is a DVD-RAM medium or an ultrahigh density RAM medium. Therefore, the data processing apparatus 10 functions as a well-known optical disc recorder. It is also assumed that the signals which are input to the data processing apparatus 10 are a digital stream signal 101 and an analog television signal 102.

The digital stream signal 101 is transmitted by a BS digital broadcast, for example. In a BS digital broadcast, video is compression-encoded by an MPEG2 video encoding scheme; an audio signal is compression-encoded by an AAC encoding scheme; and the video stream and audio stream are multiplexed into an MPEG transport stream for transmission.

On the other hand, the analog television signal 102 may be a television signal which is transmitted by an analog terrestrial broadcast, for example. Note that a digital stream signal for a Hi-Vision broadcast under the current BS digital broadcasting has a data rate of 24 Mbps. Therefore, although a Hi-Vision digital stream signal (e.g., an MPEG transport stream) cannot be directly recorded onto a DVD-RAM medium having a recording rate of 22 Mbps, it can be directly recorded onto an ultrahigh density RAM medium. A digital stream signal or an analog signal of a general standard resolution can be directly recorded onto either one of a DVD-RAM medium and an ultrahigh density RAM medium.

In an MPEG encoding scheme, compression-encoding of each frame data is performed by utilizing the pixel values in each frame composing the video. Specifically, adaptive switching is made between an intra-frame encoding process which encodes image data by utilizing intra-frame correlation between pixel values, and an inter-frame encoding process which encodes image data by utilizing inter-frame correlation between pixel values. In such encoding processes, encoded data corresponding to a plurality of consecutive frames is regarded as one unit.

Hereinafter, the constitution of the data processing apparatus 10 will be described. The data processing apparatus 10 includes a signal selector 103, a process selector 104, a system controller 108, a channel setting section 109, a recording head 110, a medium determination section 111, a remaining capacity detection section 113, a display section 114, a remaining amount calculation section 115, a recording data detection section 119, a data rate detector 120, a recording processing section 121, a table memory 122, and a videorecording mode setting section 123. Among the above, the system controller 108 is a central processing unit (CPU) which controls the operation of the entire data processing apparatus 10. The operation of the system controller 108 will be described, as necessary, in connection with the description of each constituent element.

The signal selector 103 is controlled by the system controller 108, and selects either the digital stream signal 101 or the analog television signal 102 for output, in accordance with the selected channel information. In the case of a channel which is transmitted by BS broadcast waves, the signal selector 103 outputs the digital stream signal 101. On the other hand, in the case of a channel of analog terrestrial broadcast waves, the signal selector 103 outputs a video signal and an audio signal as the analog television signal 102.

The process selector 104 is controlled by the system controller 108, and selects one of a plurality of recording processes to be executed at the recording processing section 121. In the present embodiment, it is assumed that three types of recording processes exist.

The channel setting section 109 is an interface with which the user switches channels on which to perform recording, and may be a button disposed on the front panel of the data processing apparatus 10, a remote control, a graphical user interface on the screen, or the like. The selected channel information is notified to the system controller 108.

In the present embodiment, the recording head 110 is an optical pickup. The optical pickup is capable of recording data by radiating laser of a wavelength which is in accordance with the type of the storage medium 112 onto the storage medium 112, and reading data by detecting reflected light from the storage medium 112.

The medium determination section 111 determines the type of the optical disk which is loaded to the data processing apparatus 10. In the present embodiment, it is determined which medium between a DVD-RAM medium and an ultrahigh density RAM medium, has been inserted. For example, determination information for specifying a storage medium type may be recorded at an inner peripheral portion of the storage medium at the time of manufacture, and the medium determination section 111 may optically read the determination information by using the recording head 110. Alternatively, since the intensity of the reflected light upon laser light irradiation differs depending on the type of storage medium, the intensity may be detected and subjected to determination by the medium determination section 111. Alternatively, in the case where the storage medium is loaded in a form accommodated within a cartridge, determination may be made based on the cartridge shape, which should differ depending on the type of storage medium. In any case, detection may be made by utilizing the optical characteristics and physical characteristics of the optical disk which is loaded.

The remaining capacity detection section 113 detects, as a remaining capacity, a capacity left on the storage medium 112 which permits recording. Specifically, the remaining capacity detection section 113 may read management information which is recorded on the storage medium 112, and perform the detection based on the data size or the like of the data that has already been recorded.

The display section 114 displays the remaining duration which has been calculated by and notified from the remaining amount calculation section 115. The display section 114 displays information for specifying a process which has been selected and being executed in the recording processing section 121. The display section 114 is, for example, electric display tubes, a liquid crystal panel, a television screen, or the like disposed on the front panel.

The remaining amount calculation section 115 calculates a remaining duration for which it is possible to perform recording on the storage medium 112. The remaining amount calculation section 115, which is capable of executing a plurality of remaining amount calculation processes, receives from the system controller 108 an instruction as to on the basis of which calculation process a calculation is to be performed, and selects and executes a remaining amount calculation process based on the instruction. The system controller 108 gives an instruction specifying a remaining amount calculation process corresponding to the recording process which has been selected in the recording processing section 121. The remaining amount calculation processes can be broadly classified into: remaining amount calculation processes based on the remaining capacity on the storage medium 112 and the transmission rate of program data; and remaining amount calculation processes based on the encoding rate. According to the present embodiment, the recording processing section 121 performs three types of remaining amount calculation processes. The specific description of each remaining amount calculation procedure will be provided later.

As information (management information) concerning each piece of recording data which is recorded on the storage medium 112, the recording data detection section 119 detects a recording duration and a recording rate of each piece of recording data.

The data rate detector 120 detects the data rate of the incoming digital stream signal. As a detection method thereof, the data amount in a digital stream signal which is transmitted within a predetermined period may be measured, and a data rate may be detected. Alternatively, the data rate of the program may be acquired from the section data in an EIT (event information table) packet in the transport stream. The section data is transmitted as program information.

The recording processing section 121 includes a stream recording processing section 105, a re-encode recording processing section 106, and a self-encode recording processing section 107. Via the processes in the stream recording processing section 105, the re-encode recording processing section 106, and the self-encode recording processing section 107, the recording processing section 121 outputs a video signal and an audio signal in the digital stream signal or analog television signal which has been selected by the signal selector 103.

The stream recording processing section 105 records the digital stream signal of the input program data directly onto the storage medium 112, without performing decoding or encoding.

The re-encode recording processing section 106 once decodes the input digital stream signal, again encodes it with an encoding rate different from the original encoding rate to generate an encoded stream, and then records the encoded stream onto the storage medium 112. A detailed description of the re-encode recording processing section 106 will be provided later with reference to FIG. 3.

The self-encode recording processing section 107 subjects the program data which has been obtained from the input video signal and audio signal to an encoding process to generate an encoded stream, and records the encoded stream onto the storage medium 112. This encoded stream is an MPEG program stream (PS) or an MPEG transport stream (TS). Hereinafter, recording of a program stream using the self-encode recording processing section 107, will be referred to as a PS self-encode recording process, and recording of a transport stream will be referred to as a TS self-encode recording process. Although a single inputting path to the self-encode recording, processing section 107 is illustrated in FIG. 1, the video signal and the audio signal may be input via separate paths. A detailed description of the self-encode recording processing section 107 will be provided later with reference to FIG. 2.

Figure 9:
FIG. 9 is a diagram showing an example of program information which is stored in a program information table 420.

The table memory 122 stores a control table 419 and a program information table 420. The control table 419 is a table (e.g., FIG. 4) describing correspondence between the input signal, medium, recording process, and remaining amount calculation. The program information table 420 is information representing information specifying programs, transmission rates of signals containing program data, start times and end times of programs, and the like. Instead of end times, broadcasting durations of the programs may be described. In the case where the digital stream signal is a transport stream, for example, such information is stored in the section data in an EIT (event information table) packet which is transmitted as program information. As will be described later, for example, FIG. 9 shows an example of the program information table 420 in which information specifying programs, transmission rates of signals containing program data, and start times of programs are stored.

The videorecording mode setting section 123 is an interface for setting which one of videorecording duration, video image quality, and the like is to be given precedence when performing videorecording. The videorecording mode setting section 123 may be realized in a hardware-based or software-based manner, similarly to the channel setting section 109. The "videorecording mode", as used hereinafter, is a notion which encompasses recording types, such as stream recording, self-encode recording, and re-encode recording; types of videorecording duration in self-encode recording or re-encode recording; and the like. The types of recording duration may be, for example: a long-time videorecording mode (encoding rate: 2.5 Mbps) which allows videorecording with a low image quality for a long time; a high image quality mode (encoding rate: 15 Mbps) which allows videorecording with a high image quality for a short time; and a standard-time videorecording mode (encoding rate: 5 Mbps) which is intermediary between them. In the present specification, the videorecording time modes will be represented as:

LP mode (encoding rate: 2.5 Mbps),
SP mode (encoding rate: 5.0 Mbps),
XP mode (encoding rate: 10 Mbps), and
B-XP mode (encoding rate: 15 Mbps).

Based on the above correspondence, an encoding rate or an encoding parameter is specified in terms of a videorecording time mode.

Figure 2:
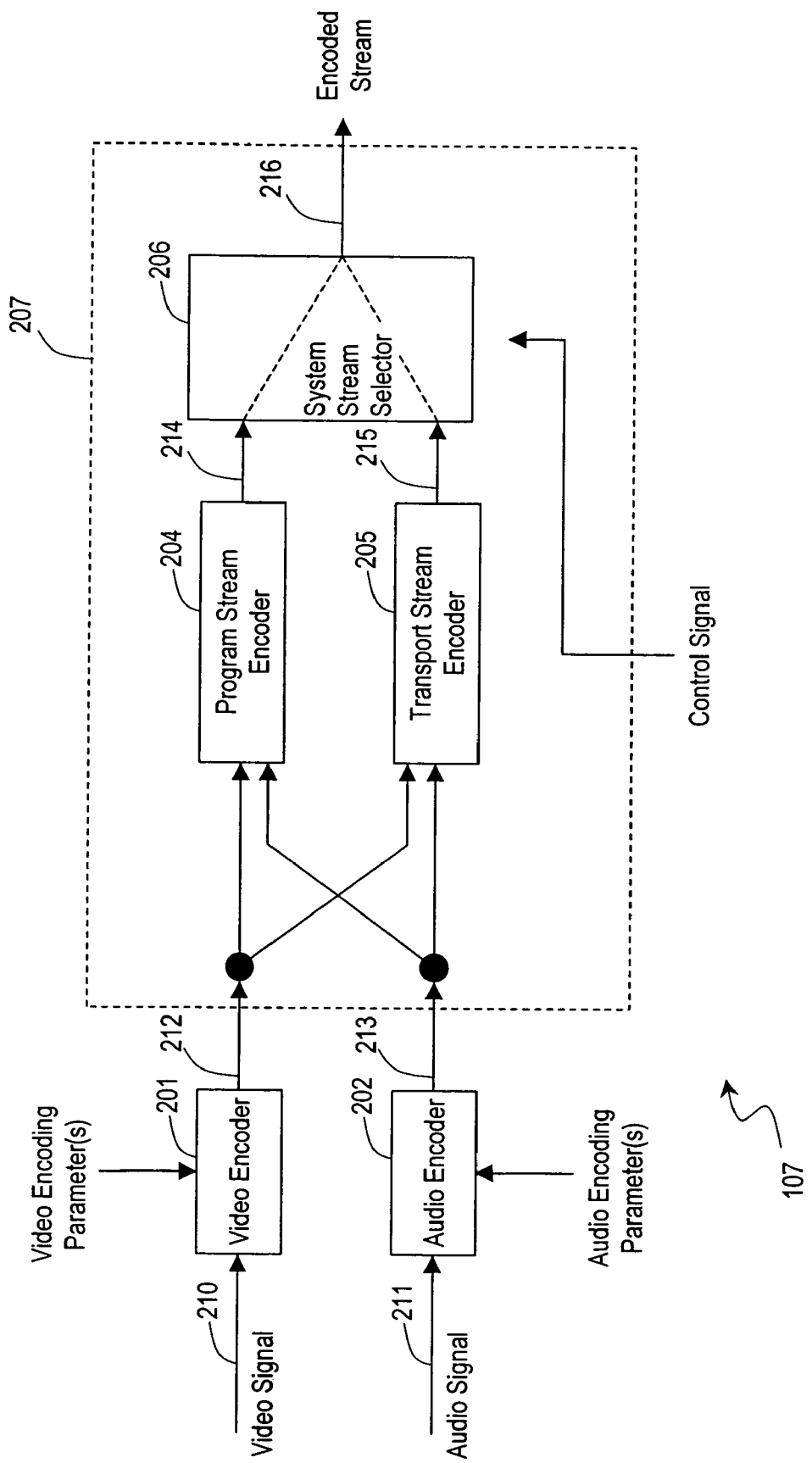
FIG. 2 is a diagram showing an exemplary constitution of functional blocks in a self-encode recording processing section 107.

FIG. 2 shows an exemplary constitution of functional blocks in the self-encode recording processing section 107. The self-encode recording processing section 107 subjects the input video signal and audio signal to encoding, and outputs an encoded stream 216. The self-encode recording processing section 107 includes a video encoder 201, an audio encoder 202, and a system encoder 207.

The video encoder 201 subjects an incoming video signal 210 to an encoding in accordance with a predetermined video encoding parameter(s), and outputs a video stream 212. The video encoding parameter(s), which includes a bit rate, a video resolution, etc., representing an encoding compression rate, are supplied by the system controller 108. An MPEG2 video encoding scheme or the like may be used as the video encoding scheme, although this is not a limitation.

The audio encoder 202 subjects an input audio signal 211 to an encoding in accordance with an audio encoding parameter(s), and outputs an audio stream 213. The audio encoding parameter(s), which includes a bit rate, a sampling frequency, etc., representing the compression rate, are supplied by the system controller 108. The audio encoding scheme may be an MPEG1 audio layer 2 scheme or the like, although this is not a limitation. An uncompressed audio encoding, e.g., a PCM signal which is used for CD audio, may be output as the audio stream 213.

The system encoder 207 multiplexes the video stream 212 and the audio stream 213 to generate the encoded stream 216 for output. In the present embodiment, the system encoder 207 includes a transport stream encoder 205 for generating a TS and a PS encoder 204 for generating a PS through multiplexing. In FIG. 2, the system stream selector 206 selects either the MPEG program stream 214 or the MPEG transport stream 215 for output, in accordance with a control signal from the system controller 108.

Concerning whether to perform multiplexing as an MPEG program stream or perform multiplexing as an MPEG transport stream, the constitution shown in FIG. 2 is not the only possible constitution. For example, the system stream selector 206 may be omitted, and either one of the encoders 204 and 205 may operate in accordance with an instruction from the system controller 108. Furthermore, it is not necessary to comprise two types of hardware in the form of the encoders 204 and 205. Encode processes corresponding to the encoders 204 and 205 may be performed by switching the software to be executed in a single piece of hardware.

Figure 3:
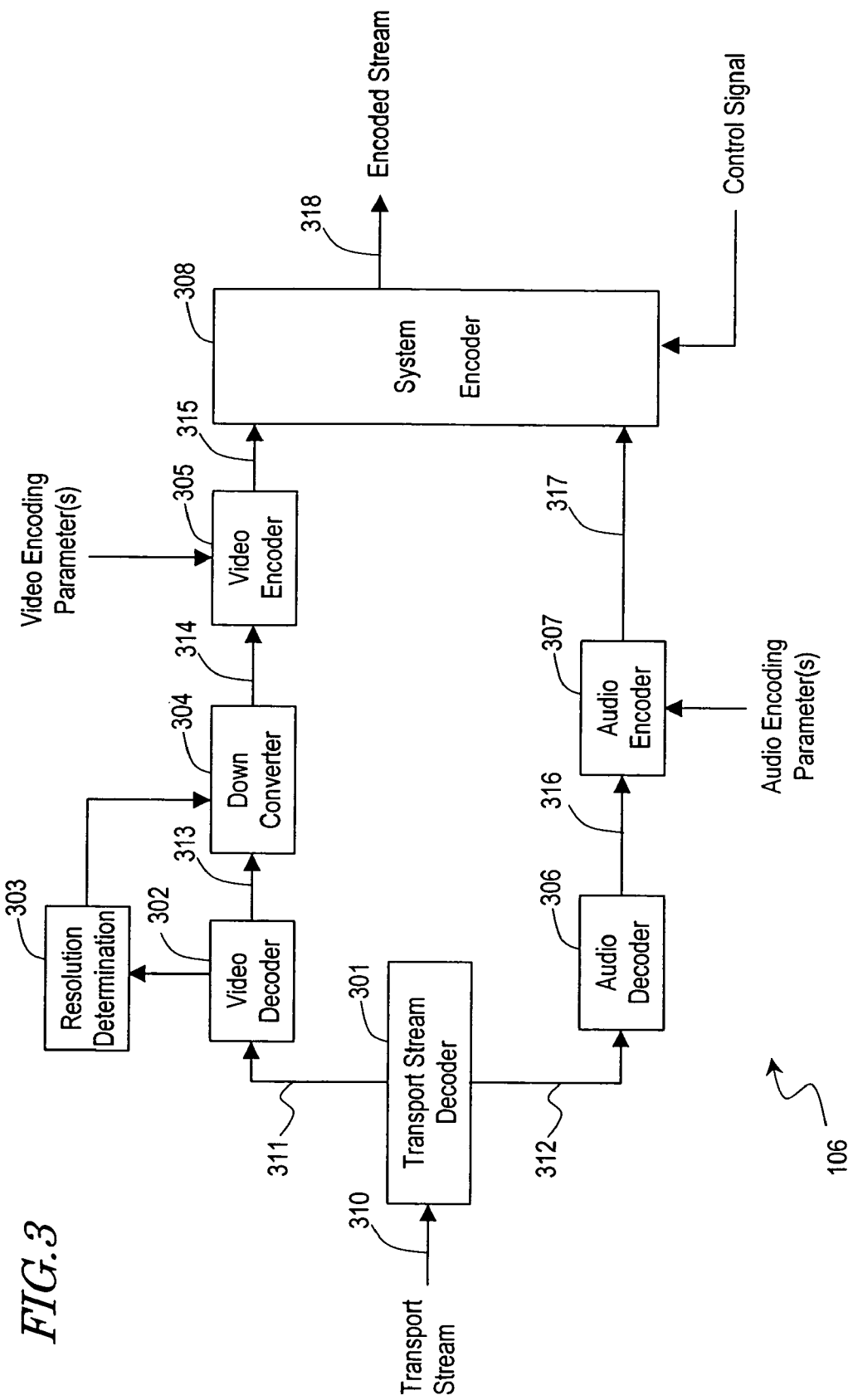
FIG. 3 is a diagram showing an exemplary constitution of functional blocks in a re-encode recording processing section 106.

FIG. 3 shows an exemplary constitution of functional blocks in the re-encode recording processing section 106. The re-encode recording processing section 106 subjects an input encoded stream 310 to a decoding process, and thereafter again performs an encoding process using an encoding parameter(s) which is different from that which was initially used, to output the resultant encoded stream. The re-encode recording processing section 106 includes a transport stream (TS) decoder 301, a video decoder 302, a resolution determiner 303, a down converter 304, a video encoder 305, an audio decoder 306, an audio encoder 307, and a system encoder 308.

The TS decoder 301 analyzes the TS 310, which is an incoming encoded digital stream signal, and separates it into a video stream 311 and an audio stream 312.

The video decoder 302 subjects the video stream 311 to a decoding process, and outputs an decoded video 313. In the present embodiment, the decoding is performed in accordance with the MPEG2 video standard.

The resolution determiner 303 detects a video resolution of the video stream. For example, resolutions such as 1920× 1080×29.97, 1440×1080×29.97, 1280×720×59.94, 720×480×59.94, and 720×480×29.97 are detected, where horizontal sample number×vertical sample number×frame frequency. The detection of the resolution can be made by reading out the resolution information which is written in the management information of the video stream. In the case of MPEG video, resolution information is described in the sequence header.

The down converter 304 converts the resolution of the decoded video 313 to a predetermined resolution, and thus outputs a down-converted video 314. For example, a resolution of 1440×1080×29.97 is converted to a resolution of 720× 480×29.97. This is realized by means of a low-pass filter process and a sampling process. In the case where the decoded video 313 has a resolution of 720×480×29.97, changing of the resolution is not performed, and the decoded video 313 is output as it is.

The video encoder 305 subjects the video data 314 after conversion to an encoding process, and outputs a video stream 315. The encoding parameter(s) for the encoding process is supplied by the system controller 108. The encoding parameter(s) includes the encoding compression rate and the like, which should be different from that of the video stream 311 contained in the initial TS which has been input. Note that the encoding method may be an MPEG2 video encoding scheme, or any other scheme.

The audio decoder 306 subjects the audio stream 312 to a decoding process, and outputs the decoded audio data 316. In the present embodiment, the audio decoder 306 performs the decoding process in accordance with the AAC standard.

The audio encoder 307 subjects audio data 316 which has been decoded in accordance with the encoding parameter(s) supplied by the system controller 108 to an encoding process, and outputs an audio stream 317. As for the encoding method, an MPEG1 audio layer 2 scheme may be used to perform the encoding process, although this is not a limitation.

The system encoder 308 multiplexes the video stream 315 and the audio stream 317 to generate an encoded stream 318 for output. Similarly to the system encoder 207 illustrated in the self-encode recording section of FIG. 2, the system encoder 308 selectively outputs either a TS or a PS. The selection is controlled by a control signal from the system controller 108.

In the case where the input video and audio have identical encoding parameters, the re-encoding process of the video and audio may be omitted, and the MPEG transport stream may simply be converted to an MPEG program stream. In this case, the video stream 311 and the audio stream 312 may be input to the system encoder 308, and subjected to a system encode process.

Similarly, in the case where only the video or only the audio is to be subjected to a re-encoding process, only the signal to be subjected to a re-encoding process may be decoded and encoded, whereas the stream which is not to be subjected to a re-encoding process may be directly input to the system encoder 308.

Although it is assumed that the decoded signal which is obtained through a decoding process is again subjected to an encoding process in the re-encoding process, this is not a limitation. For example, only a part of the decoding process may be performed, and only the decoded part may be subjected again to an encoding process. Specifically, in an MPEG encoding scheme which uses a discrete cosine transform (DCT) encoding process, after obtaining a DCT coefficient(s) through a dequantization of symbols which have been variable-length decoded, an inverse DCT transform may be performed to obtain a decoded video signal. Moreover, in the encoding process, a video stream is obtained by performing a quantization process and a variable-length encoding process for the DCT coefficient(s) having been obtained through a DCT transform process. However, the video decoder 302 may perform the process only up to the restoration of a DCT coefficient(s). In this case, to obtain the video stream 315, the video encoder 305 performs a quantization process and a variable-length encoding process for the decoded DCT coefficient(s) in accordance with the encoding parameter(s). With such a constitution, it is possible to omit the inverse DCT transform process by the video decoder 302 and the DCT transform process by the video encoder 305.

As in an MPEG encoding scheme, in the case where a motion-compensated prediction encoding is performed, a re-encoding process may be performed by utilizing a motion vector which is contained in the incoming video stream. By doing so, it becomes possible to omit the motion vector detection process in the video encoder 305.

Note that the constituent elements for encoding processes (which in the present embodiment are: the video encoder 201, the audio encoder 202 and the system encoder 207, as well as the video encoder 305, the audio encoder 307, and the system encoder 308) may be shared between the self-encode recording processing section 107 and the re-encode recording processing section 106.

Hereinafter, in the re-encode recording processing section 106, recording of a PS will be referred to as a PS re-encode recording process, and recording of a TS will be referred to as a TS re-encode recording process.

Next, the recording processes in the recording processing section 121 will be described in detail. The recording processing section 121 performs a recording process which is selected through the selection operation by the process selector 104. The selection of a recording process is made based on the type of the input signal, and the type of the storage medium 112. Hereinafter, the signal recording processes in the cases where a digital stream signal and an analog television signal are input will be described. Note that the relationship between the selection process and recording process in connection with the following descriptions is as described in the control table 419 in the table memory 122. FIG. 4 shows an example of the control table 419. In the control table 419, a correspondence between input signals, media, recording processes, and remaining amount calculations is described. The system controller 108 may give instructions to the respective constituent elements in accordance with the control table 419, or may output instructions for realizing the below-described processes without providing such a table.

[Recording of a Digital Stream Signal]

While a channel for a BS digital broadcast is being set via the channel setting section 109, a digital stream signal is input to the data processing apparatus 10.

When the storage medium 112 is loaded to the data processing apparatus 10 and the storage medium 112 is determined to be a DVD-RAM medium by the medium determination section 111, the system controller 108 controls the process selector 104 so that the signal is routed to be transmitted to the re-encode recording processing section 106. The re-encode recording processing section 106 converts the TS which is transmitted via BS digital broadcast to a PS, and records it onto the DVD-RAM medium. This PS is recorded, for example, in a format which complies with the DVD video-recording standard. In the case where the input video signal is a Hi-Vision signal, the re-encode recording processing section 106 down-converts the signal to a standard television resolution (720×480×29.97) and records the converted signal.

Next, if the storage medium 112 is determined to be an ultrahigh density RAM medium by the medium determination section 111, the system controller 108 controls the process selector 104 so that the signal is routed to be transmitted to the stream recording processing section 105. Thus, the input TS is directly recorded onto the ultrahigh density RAM medium, without being decoded or encoded. Since no re-encode process is performed, no new encoding noise occurs. Therefore, data which is faithful to the input can be recorded. In the case where the TS contains a plurality of programs, the data of a particular program can be extracted by utilizing the packet ID which is assigned to each packet in the TS, and recorded. Since this process involves neither decoding nor encoding, it can also be regarded as a stream recording process.

[Recording of an Analog Television Signal]

Next, while a channel for receiving an analog terrestrial is being selected by the channel switching user interface 109, an analog television signal is input to the data processing apparatus 10.

Once the storage medium 112 is loaded to the data processing apparatus 10, the system controller 108 controls the process selector 104 so that the signal is routed to be transmitted to the self-encode recording processing section 107, irrespective of the type of storage medium which is recognized by the medium determination section 111. However, if the storage medium 112 is a DVD-RAM medium, the system controller 108 causes the system encoder 207 to output a PS of a format complying with the DVD video-recording standard. On the other hand, if the storage medium 112 is an ultrahigh density RAM medium, the system encoder 207 causes a TS to be output.

In the above process, the display section 114 of the data processing apparatus 10 may activate a text character or the like representing the recording process which is under execution, thus indicating the type of recording process under execution to the user. FIG. 5(*a*) shows examples of text characters which can be displayed on the display section 114. The display section 114 is capable of displaying three kinds of text characters; that is, a "Stream" indication 401, a "Self" indication 402, and a "DC" indication 403.

FIG. 5(*b*) indicates that a recording process is performed by the stream recording processing section 105. In the case of the above example, when a channel for a BS digital broadcast is set and a signal recording for an ultrahigh density medium is performed, only the "Stream" indication 401 is activated. FIG. 5(*c*) indicates that a recording process is performed by the self-encode recording processing section 107. In the case of the above example, when a channel for a terrestrial analog broadcast is set, only the "Self" indication 402 is activated. This does not depend on the type of storage medium. FIG. 5(*d*) indicates that a recording process is performed by the re-encode recording processing section 106. In the case of the above example, when a channel for a BS digital broadcast is set and signal recording for a DVD-RAM medium is performed, "DC" 403 is activated. By displaying a videorecording mode on the display section 114 as shown in FIGS. 5(*b*) to (*d*), the user is allowed to recognize the recording process which is being selected.

Once the input signal and the storage medium are determined, and a recording process is determined through the aforementioned procedure, then, the remaining amount calculation section 115 calculates a remaining capacity or remaining duration for which it is possible to perform recording on the storage medium 112. In the present specification, the remaining capacity or remaining duration will be referred to as a "remaining amount", and the calculation for obtaining a remaining amount will be referred to as a "remaining amount calculation".

Figure 6:
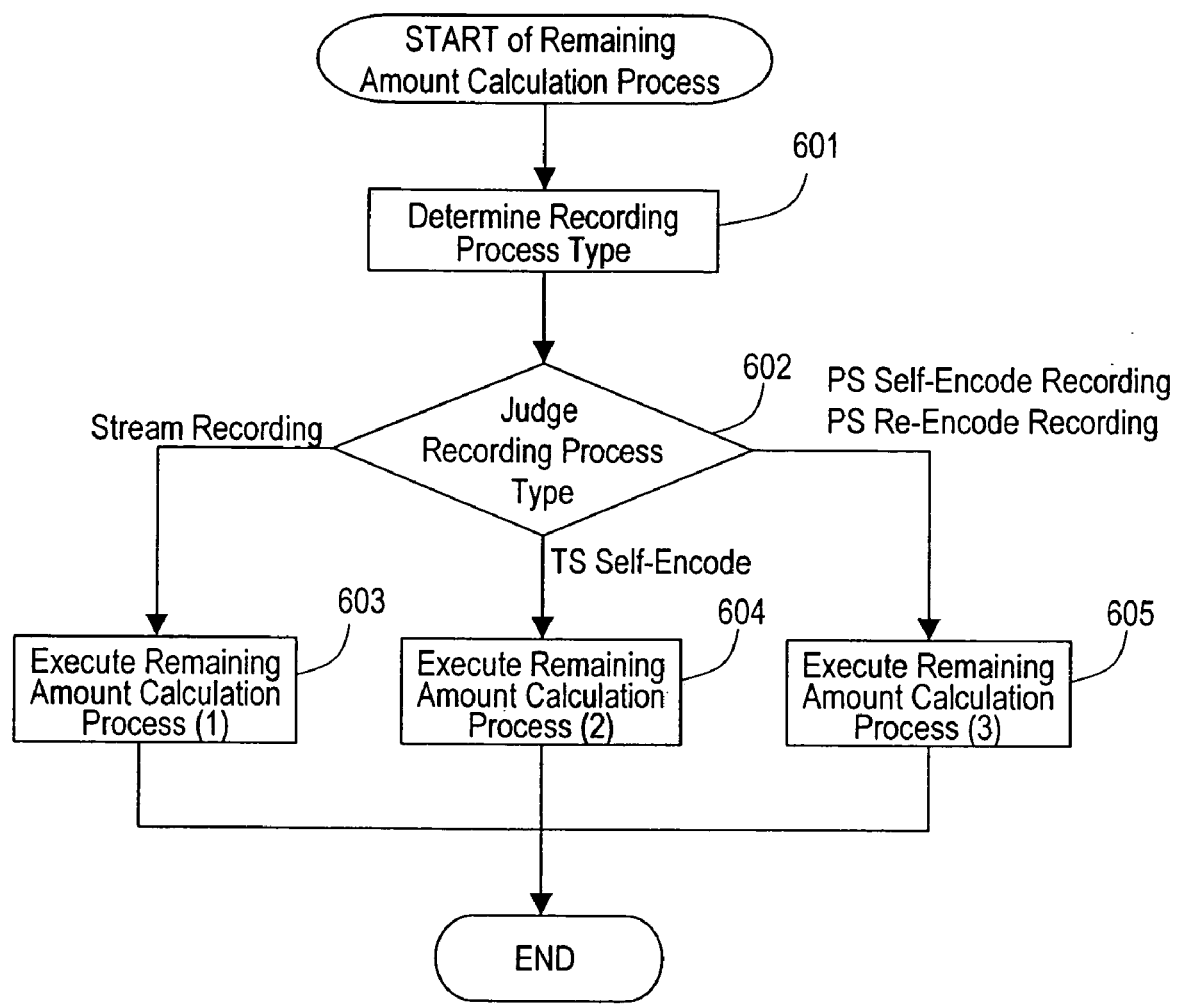
FIG. 6 is a chart showing the procedure of a remaining amount calculation process.

FIG. 6 shows the procedure of a remaining amount calculation process. In the present embodiment, the system controller 108 selects one of remaining amount calculation processes (1), (2), and (3) in accordance with the type of recording process, and the remaining amount calculation section 115 calculates the remaining amount in accordance with the selection.

When the process is begun, the type of the recording process is first determined at step 601. The types of recording processes are the respective processes of: stream recording; PS self-encode recording; and PS re-encode recording. The specific details of this process will be described later with reference to FIG. 7. At step 602, the system controller 108 judges which recording process is to be performed. In the case where a stream recording process is performed, the process proceeds to step 603, where the remaining amount calculation process (1) is executed. In the case where a TS self-encode recording process is to be performed, the process proceeds to 604, where the remaining amount calculation process (2) is executed. In the case where a PS self-encode recording process or a PS re-encode recording process is to be performed, the process proceeds to step 605, where the remaining amount calculation process (3) is executed.

The remaining amount calculation processes (1) and (2) realize calculation and management of the remaining amount based on the remaining capacity of the storage medium 112. On the other hand, the remaining amount calculation process (3) realizes calculation and management of the remaining amount based on the recording duration of the data. Hereinafter, a remaining amount management based on capacity will be referred to as a "capacity-base remaining amount management", whereas a remaining amount management based on time will be referred to as a "time-base remaining amount management". The specific processes of the processes (1) to (3) will be described later in detail.

The reason why the remaining amount calculation process (3) through time-base remaining amount management is selected when performing a PS self-encode recording or a PS re-encode recording is that, in either case, an encoding process is performed at the data processing apparatus 10 side, so that it is possible to adjust the encoding rate, and, after a data erasure, recording can be guaranteed for a duration corresponding to the erased data. On the other hand, in the case of performing a stream recording or a TS self-encode recording, a capacity-base remaining amount management is performed. In these cases, recording is performed in the TS format, but stream recording and TS self-encode recording are both present. Therefore, a capacity-base remaining amount management is performed to ensure efficient utilization of capacity at the time of stream recording.

Thus, by determining the remaining amount calculation process in accordance with the recording process, an appropriate and accurate remaining amount calculation can be realized in connection with each recording process. As will be described later, this allows the capacity of the storage medium 112 to be efficiently utilized, thus realizing a remaining amount management which is easy for the user to understand.

Figure 7:
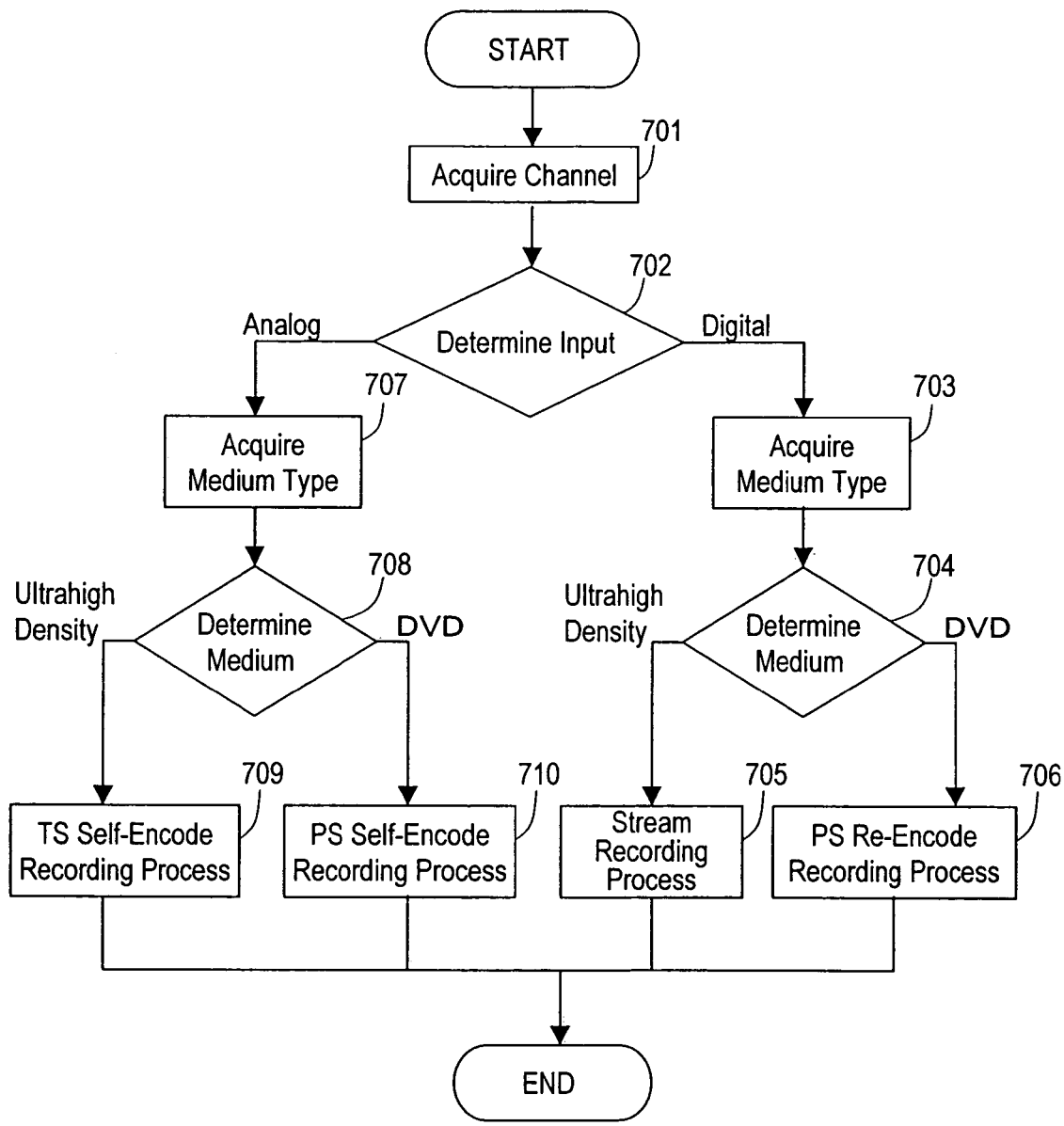
FIG. 7 is a chart showing a recording process determining procedure.

Now, referring to FIG. 7, a recording process determining procedure which is performed at step 601 of FIG. 6 will be described. FIG. 7 shows a recording process determining procedure. First, at step 701, the system controller 108 acquires the information of a channel which has been set by the user. At step 702, the signal selector 103 determines the type of the input signal. If the input signal is a digital stream signal, the process proceeds to step 703. If the input signal is an analog television signal, the process proceeds to step 707.

At step 703, the system controller 108 acquires the type of the storage medium 112 which is loaded (as determined by the medium determination section 111) and determines this type at step 704. In the case of a DVD-RAM medium, the process proceeds to step 706. In the case of an ultrahigh density RAM medium, the process proceeds to step 705. At step 705, it is determined that a stream recording process is to be performed. Thereafter, the system controller 108 issues an instruction to the process selector 104 to cause the process selector 104 to select the stream recording processing section 105, whereby the input digital stream signal is stream-recorded onto the ultrahigh density medium. On the other hand, at step 706, it is determined that a re-encode recording process is to be performed. The system controller 108 issues an instruction to the process selector 104 to cause the process selector 104 to select the re-encode recording processing section 106, whereby the input digital stream signal is decoded, re-encoded into a PS, and then recorded onto the DVD-RAM medium.

At step 707 and step 708, the same processes as those of steps 703 and 704 described above are performed to determine the type of the storage medium 112 which is loaded. In the case of a DVD-RAM medium, the process proceeds to step 710. In the case of an ultrahigh density RAM medium, the process proceeds to step 709. At step 709, it is determined that a self-encode recording process into a TS is to be performed. Thereafter, the system controller 108 issues an instruction to the process selector 104 to cause the process selector 104 to select the self-encode recording processing section 107, whereby the input analog television signal is subjected to an encoding process so as to be converted into a TS, and recorded onto the ultrahigh density medium. At step 710, it is determined that a self-encode recording process into a PS is to be performed. The system controller 108 issues an instruction to the process selector 104 to cause the process selector 104 to select the self-encode recording processing section 107, whereby the input analog television signal is subjected to an encoding process so as to be converted into a PS, and recorded onto the DVD-RAM medium.

According to the process described above, by merely setting a channel, the user can allow a recording process to be automatically selected without being aware of the type of input signal and the type of storage medium, whereby an optimum recording process is performed.

Next, the remaining amount calculation process (1) to be performed at step 603 of FIG. 6 will be described. In the present embodiment, three kinds of examples in which the remaining amount calculation process (1) is applicable will be illustrated. Hereinafter, these instances will be represented as remaining amount calculation processes (1a), (1b), and (1c).

Remaining Amount Calculation Process (1a):

In the remaining amount calculation process (1a), a data rate Rs of the digital stream signal 101 is detected by the data rate detector 120, and the remaining amount calculation section 115 calculates a remaining duration TR1 from the detected data rate Rs and the remaining capacity CR, as in the following equation.

$$TR1 = CR/Rs \qquad \text{(eq. 1)}$$

Figure 8:
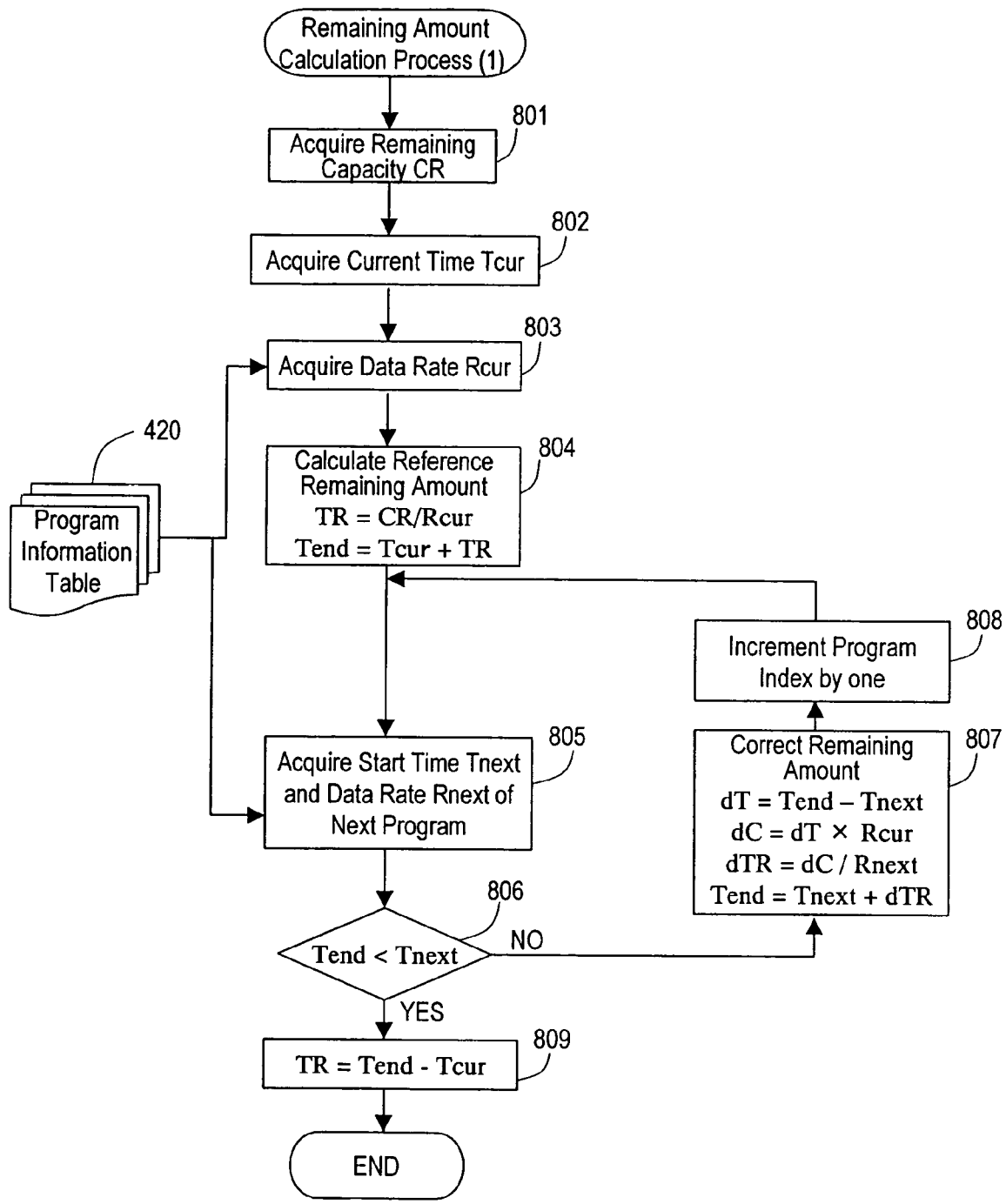
FIG. 8 is a chart showing the calculation procedure of a remaining amount calculation process (1b).

Remaining Amount Calculation Process (1b):

In the remaining amount calculation process (1b), the remaining amount calculation section 115 calculates a remaining amount by acquiring, together with the program information which is currently being transmitted, the program information of any program to be subsequently transmitted. FIG. 8 shows the calculation procedure of the remaining amount calculation process (1b). At step 801, the remaining amount calculation section 115 acquires the remaining capacity CR as detected by the remaining capacity detection section 113. At step 802, the remaining amount calculation section 115 acquires the current time Tcur. The current time Tcur can be acquired from a clock which is provided in the recording apparatus, or from a time information packet (TOT) within the TS. At step 803, the remaining amount calculation section 115 acquires the data rate Rcur of the program which is currently being received.

The data rate Rcur is acquired from the information which is stored in the program information table 420. FIG. 9 shows an example of program information which is stored in the program information table 420. Herein, start times and data rates of program a, program b, program c, and program d are stored, the start times being denoted as T(a), T(b), T(c), and T(d), respectively, and the data rates being denoted as R(a), R(b), R(c), and R(d), respectively. Program a is the program which is currently being received. Programs b to d denote programs to be subsequently transmitted. The data rates are specified in terms of whether the signal of the program is a standard resolution (SD) signal or a high resolution (HD) signal, or the like. If it is determined that program a is transmitted via an SD signal, for example, the system controller 108 generates program information whose R(a) is set at 12 Mbps. If it is determined that program a is transmitted via an HD signal, the system controller 108 generates program information whose R(a) is set at 24 Mbps.

Referring back to FIG. 8, at step 804, a reference remaining duration TR is calculated by using the data rate Rcur and the remaining capacity CR, as in the following equation.

$$TR = CR/Rcur \qquad (eq. 2)$$

Next, a reference final scheduled time Tend at which the remaining capacity will reach zero is determined.

$$Tend = Tcur + TR \qquad (eq. 3)$$

The reference remaining duration TR and the reference final scheduled time Tend are the remaining duration and the scheduled time at which the remaining amount will reach zero, respectively, under the assumption that the input will keep coming at the data rate Rcur. At the next step 805, the remaining amount calculation section 115 acquires a start time Tnext and a data rate Rnext of a next program, based on the program information table memory 420. At step 806, the remaining amount calculation section 115 compares the final scheduled time Tend against the start time Tnext of the next program to judge which one of them is greater. This is a judgment as to whether the next program can be recorded or not. In the case where the next program is to be started by the final scheduled time Tend (in the case where Tend≧Tnext), it is judged that the next program can be recorded and the process proceeds to step 807. Otherwise, the process proceeds to step 409. At step 807, the remaining duration is corrected. First, according to the following equation, the remaining amount calculation section 115 determines a duration dT from a time Tnext at which the next program is started until the final scheduled time Tend.

$$dT = Tend - Tnext \qquad (eq. 4)$$

Next, assuming that the input keeps coming at the data rate of Rcur, a data amount dC which will be incurred in the duration dT will be determined according to the equation.

$$dC = dT \times Rcur \qquad (eq. 5)$$

The data amount dC represents a capacity which is allotted to the recording of the next program. Then, according to the following equation, the remaining amount calculation section 115 determines a duration dTR for which the next program can be recorded. In this case, the data amount is dC, and the data rate of the next program is Rnext.

$$dTR = dC/Rnext \qquad (eq. 6)$$

Next, the remaining amount calculation section 115 again calculates a final scheduled time Tend. Since the next program will be started at the time Tnext, and the recording of the next program is possible for the duration dTR, the final scheduled time Tend can be determined from the following equation.

$$Tend = Tnext + dTR \qquad (eq. 7)$$

At step 808, the remaining amount calculation section 115 increments the index of the program by one, and returns to step 805. In other words, the processes of steps 805 and 806 are repeated again with respect to a still next program. At step 809, the remaining amount calculation section 115 determines the remaining duration TR by using the updated time Tend.

$$TR = Tend - Tcur \qquad (eq. 8)$$

In the remaining amount calculation process (1), the remaining duration TR can be determined through the above-described procedure.

Figure 10:
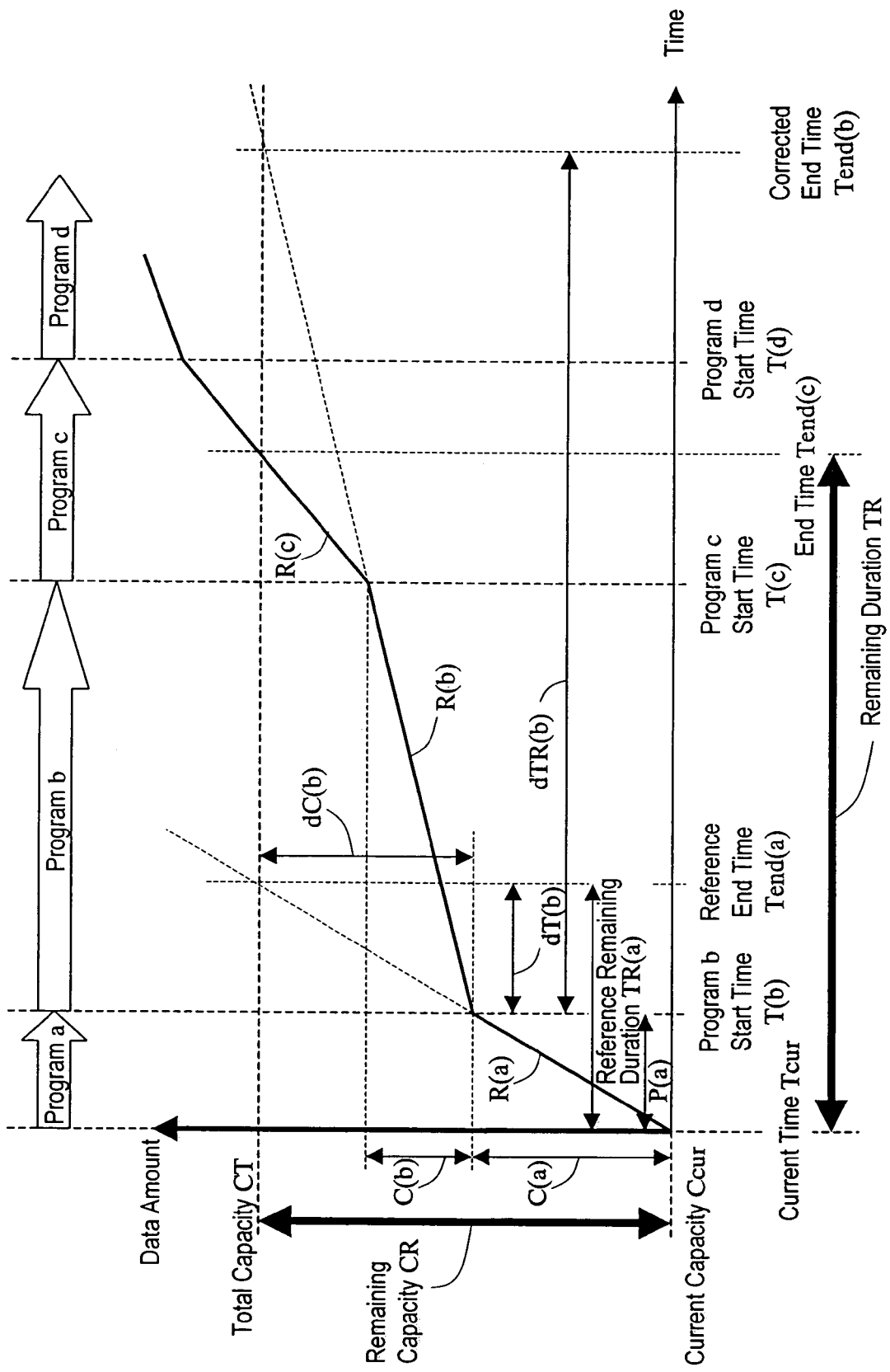
FIG. 10 is a diagram showing a relationship between times of recording of programs and data amount to be recorded.

Next, with reference to FIG. 10, a more specific description will be given. FIG. 10 shows a relationship between times of recording of programs and data amount to be recorded. In FIG. 10, time is taken on the horizontal axis and data amount is taken on the vertical axis, and the origin represents a current time Tcur and a capacity Ccur which is currently being used. The storage medium is shown to have a total capacity of CT, and a remaining capacity of CR(=CT−Ccur). As a flow of programs, it is illustrated that program a is currently being broadcast, and subsequently program b, program c, and program d are to be broadcast. The program information of each program is described in the program information table memory 420 shown in FIG. 9.

First, the temporal transition of data amount when recording the program a, which is currently being input, is represented by a line having a gradient which is equal to a data rate R(a). The time at which this line reaches the total capacity CT is the end time Tend(a).

In this example, program b is started from T(b), which is a time before reaching Tend(a). Therefore, the data amount transitions in such a manner that it increases with the gradient R(a) up to time T(b), but with a gradient R(b) from time T(b) on. Herein, C(a) is a data amount which is expected when program a is recorded, and the data amount dC(b) is the remaining capacity which is scheduled at the start time T(b) of program b.

A scheduled end time is determined also with respect to program b, similarly to program a. Specifically, assuming that the data amount transitions along a line with the gradient R(b) from the program b start time T(b), a scheduled end time Tend(b) at which the total capacity CT will be reached is determined.

In FIG. 8, program c is started before reaching the scheduled end time Tend(b). In this case, at step 806 of FIG. 8, scheduled end time Tend(b)≧Tnext. As for program c, the data amount transitions with a gradient R(c) from time T(c), until reaching the total capacity CT at the scheduled end time Tend(c). Since the scheduled end time Tend(c) falls before a start time T(d) of the next incoming program d, Tend(c) is the scheduled end time Tend. Consequently, the duration from the current time Tcur to Tend is the remaining duration TR to be determined.

The remaining duration TR which has thus been determined is regarded as the remaining duration TR1 in the remaining amount calculation process (1b). In the above-described calculation process, the remaining duration is determined by using not only the program information (data rate and program start time) of the program which is currently being input, but also the data rates and program start times of the programs to be input in future, and therefore an accurate calculation is possible. By displaying the calculated duration on the display section 114, the user's convenience is improved.

Although a case has been illustrated where a data rate is acquired as program information, the remaining duration may be calculated by acquiring the data amount of each program. In this case, the broadcasting duration of the program may be determined from a difference between the start time and the end time, and a data rate can be calculated by dividing the data amount by this program duration.

Figure 11:
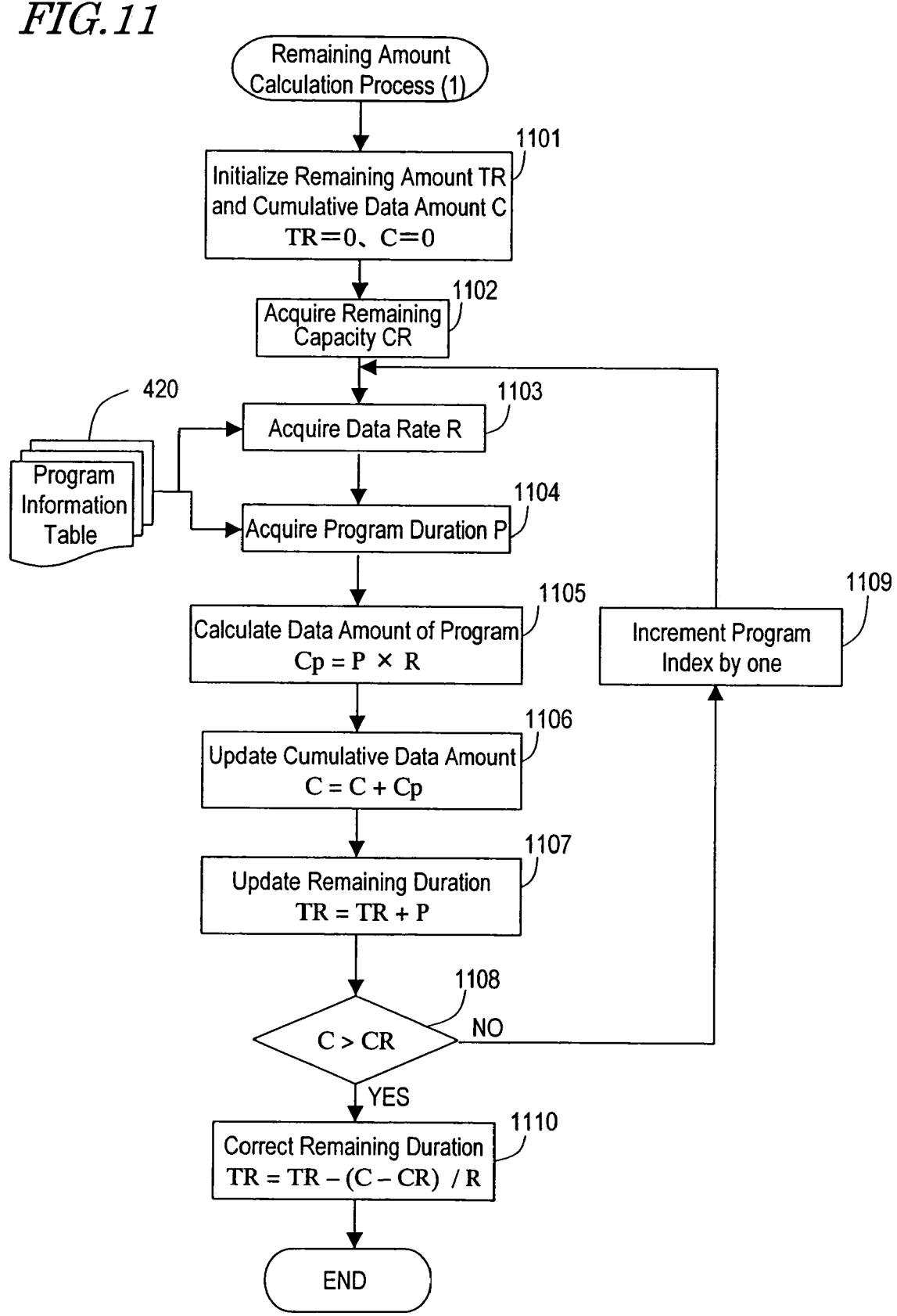
FIG. 11 is a chart showing the calculation procedure of a remaining amount calculation process (1c).

Remaining amount calculation process (1c):

In the remaining amount calculation process (1c), the remaining amount calculation section 115 calculates the remaining amount while cumulatively adding the data amounts of incoming programs and judging whether the total capacity is reached or not. FIG. 11 shows the calculation procedure of the remaining amount calculation process (1c). At step 1101, the remaining amount calculation section 115 initializes the remaining duration TR and the cumulative data amount C (TR=0, C=0). At step 1102, the remaining amount calculation section 115 acquires the remaining capacity CR which has been detected by the remaining capacity detection section 113. At step 1103, the remaining amount calculation section 115 acquires a data rate R from the program information table 420. At step 1104, a program duration P is acquired. The program duration P may be calculated from the program start time and the program end time. However, in the case where the program duration is transmitted as program information, the program duration P may be detected by reading out the transmitted information. Each program duration may be stored in the program information table 420. At step 1105, a data amount Cp of the program is calculated from the program duration P and the data rate R.

$$Cp=P\times R \qquad (eq.\ 9)$$

At step 1106, the remaining amount calculation section 115 updates the cumulative data amount C according to the following equation.

$$C=C+Cp \qquad (eq.\ 10)$$

At step 1107, the remaining amount calculation section 115 updates the remaining duration TR according to the following equation.

$$TR=TR+P \qquad (eq.\ 11)$$

The above two equations mean that a calculation result of the right-hand side is adopted as a value of the variable on the left-hand side.

At step 1108, the remaining amount calculation section 115 compares the remaining capacity CR against the cumulative data amount C to judge which one of them is greater. This is a judgment as to whether the next program can be recorded or not. In the case where the cumulative data amount C has not reached the remaining capacity CR, the remaining amount calculation section 115 judges that the next program can be recorded, and the process proceeds to step 1109; otherwise, the process proceeds to step 1110. At step 1109, the program index is incremented by one, and the process returns to step 1103. In other words, the processes from steps 1103 to 1108 are repeated again with respect to a still next program. At step 1110, the remaining amount calculation section 115 corrects the remaining duration TR, and finalizes the remaining duration TR.

$$TR=TR-(C-CR)/R \qquad (eq.\ 12)$$

On the right-hand side of the above equation, a duration (=(C−CR)/R) corresponding to the capacity (=C−CR) exceeding the remaining capacity CR is subtracted from the remaining duration TR as updated at step 507. The result of the subtraction is used as a new, corrected TR value.

According to the above calculation process, the remaining duration can be calculated as accurately as in the remaining amount calculation process (1b). By displaying the calculated duration on the display section 114, the user's convenience is improved.

In the remaining amount calculation process (1c), too, the remaining duration may be calculated by acquiring the data amount of each program as program information. Referring back to FIG. 10, the remaining amount calculation process (1c) will be described more specifically. First, the program duration P(a) of program a is determined in the following manner, as a duration from the current time Tcur until the end time of program a. Note that the end time of program a is equal to the start time T(b) of program b.

$$P(a)=T(b)-Tcur \qquad (eq.\ 13)$$

Assuming that the remaining duration TR is the program duration P(a), $$TR=P(a). \qquad (eq.\ 14)$$

By using the data rate R(a), the data amount C(a) when recording program a can be expressed as:

$$C(a)=P(a)\times R(a). \qquad (eq.\ 15)$$

The cumulative data amount C which is expected after recording the program a is:

$$C=C(a). \qquad (eq.\ 16)$$

In FIG. 10, since the total recording data amount of program a is less than the remaining capacity CR (C(a)<CR), it is determined whether the next program b can be recorded or not. By using the program duration P(b) and data rate R(b) of program b, the remaining duration TR is updated, and the data amount C(b) and cumulative data amount C of program b are determined.

$$P(b)=\text{start time } T(c) \text{ of program } c-\text{start time } T(b) \text{ of program } b \qquad (eq.\ 17)$$

$$TR=TR+P(b)=P(a)+P(b) \qquad (eq.\ 18)$$

$$C(b)=P(b)\times R(b) \qquad (eq.\ 19)$$

$$C=C+C(b)=C(a)+C(b) \qquad (eq.\ 20)$$

In FIG. 10, since the cumulative data amount C is still less than the remaining capacity CR (C(a)+C(b)<CR), it is determined whether the next program c can be recorded or not.

$$P(c)=\text{start time } T(d) \text{ of program } d-\text{start time } T(c) \text{ of program } c \qquad (eq.\ 21)$$

$$R=TR+P(c)=P(a)+P(b)+P(c) \qquad (eq.\ 22)$$

$$C(c)=P(c)\times R(c) \qquad (eq.\ 23)$$

$$C=C+C(c)=C(a)+C(b)+C(c) \qquad (eq.\ 24)$$

As shown in FIG. 10, the cumulative data amount C exceeds the remaining capacity CR during the recording of program c. Therefore, the data processing apparatus 10 determines that a part of program c can be recorded.

Next, the remaining amount calculation section 115 performs a correction of the remaining duration TR with respect to the amount exceeding the remaining capacity CR, thus finalizing the remaining duration.

$$TR = TR - (C - CR)/R(c) \quad \text{(eq. 25)}$$
$$= P(a) + P(b) + P(c) - (C - CR)/R(c)$$

The above equation may be modified to give:

$$TR = P(a) + P(b) + (CR - C(a) - C(b))/R(c). \quad \text{(eq. 26)}$$

Although an example has been illustrated where the end time of each program coincides with the start time of each next program, this is not a limitation. For example, the system controller 108 may acquire both of the program start time and the program end time from the program information.

The remaining duration TR which has thus been determined is regarded as the remaining duration TR1 in the remaining amount calculation method (1). The remaining amount calculation section 115 determines the remaining duration TR1 by using the updated time Tend.

In the present embodiment, three examples (1a) to (1c) have been described with reference to the remaining amount calculation method (1). Among these, the remaining amount calculation section 115 of the data processing apparatus 10 may have a function of calculating the remaining duration by, for example, the remaining amount calculation method (1b).

Next, the remaining amount calculation process (2) to be performed at step 604 of FIG. 6 will be described. In the present embodiment, two kinds of examples in which the remaining amount calculation process (2) is applicable will be illustrated. Hereinafter, these instances will be represented as remaining amount calculation processes (2a) and (2b).

Remaining amount calculation process (2a):

In the remaining amount calculation process (2a), by utilizing the encoding rate Re and remaining capacity CR which are utilized in the encoding processes of the re-encode recording process 106 and the self-encode recording process, the remaining amount calculation section 115 calculates the remaining duration TR2 according to the following equation.

$$TR2 = CR/Re \quad \text{(eq. 27)}$$

The encoding rate Re is determined from the videorecording time mode. For example, the encoding rate Re is 2.5 Mbps under the long-time videorecording mode (LP mode), and is 5 Mbps under the standard-time videorecording mode (SP mode).

Remaining amount calculation process (2b):

The remaining amount calculation process (2b) is a calculation process which is available when the encoding process is a variable bit rate (VBR) encoding process.

In general, in VBR encoding, the encoding rate is increased or decreased relative to a target average encoding rate, while taking into consideration how complicated the input signal is, thus realizing a high image quality and a high sound quality. Therefore, the actual encoding rate does not necessarily coincide with the average encoding rate which has been set as a target. Accordingly, a VBR margin M is defined, such that the encoding rate is varied within the VBR margin M. Specifically, the rate is controlled so that an error data amount D occurring due to a difference between the average encoding rate Rea and the actually-occurring data rate Rg does not exceed the VBR margin M. As a result, the data amount G incurred in the recording duration Tr never exceeds a maximum data amount Gmax which is determined by the following equation.

$$Gmax = Rea \times Tr + M \quad \text{(eq. 28)}$$

In other words, recording of the program data is guaranteed for a remaining duration TRvbr, determined by dividing by the average encoding rate Rea a capacity which is obtained by subtracting the VBR margin M from the remaining capacity CR.

$$TRvbr = (CR - M)/Rea \quad \text{(eq. 29)}$$

By replacing the average encoding rate Rea with the encoding rate Re, the remaining amount calculation section 115 determines the remaining duration TR2 as follows.

$$TR2 = (CR - M)/Re \quad \text{(eq. 30)}$$

As a rate controlling method which abides by the VBR margin M, a quantization parameter in the encoding process may be controlled. As the quantization parameter is increased, the data amount is reduced, whereas as the quantization parameter is decreased, the data amount is increased. Therefore, a feedback control as follows may be performed, for example.

$$Q = Qst \times M/(M - F \times D) \quad \text{(eq. 31)}$$

Herein, Qst is a predetermined initial quantization parameter; and F is a positive significant number of one or less, which is a predetermined value determined by the intensity of feedback.

In the present embodiment, two examples (2a) and (2b) have been described with reference to the remaining amount calculation method (2). Among these, the remaining amount calculation section 115 of the data processing apparatus 10 may have a function of calculating the remaining duration by, for example, the remaining amount calculation method (2b).

Next, the remaining amount calculation process (3) to be performed at step 605 of FIG. 6 will be described. In the present embodiment, two kinds of examples in which the remaining amount calculation process (3) is applicable will be illustrated. Hereinafter, these instances will be represented as remaining amount calculation processes (3a) and (3b).

Remaining amount calculation process (3a):

In the remaining amount calculation process (3a), the remaining amount calculation section 115 calculates a remaining duration TR3 based on the recording duration Tr, recording rate Rr, and encoding rate Re of each piece of recording data. Hereinafter, the recording duration of an $i^{th}$ piece of recording data will be denoted as Tr(i), and the recording rate as Rr(i), and so forth. By defining Rrs as the reference recording rate, the remaining amount calculation section 115 calculates a reference recording duration Trs(i) by normalizing each recording duration.

$$Trs(i) = Tr(i) \times Rr(i)/Rrs \quad \text{(eq. 32)}$$

The sum total of the reference recording durations Trs(i) will be denoted as Trs. By using such normalized recording durations, it becomes possible to calculate recording durations, which are independent of the recording rate, to serve as references.

$$Trs = Sum[Trs(i)] \quad \text{(eq. 33)}$$

(Sum[ ]: indicates addition in connection with total recording data)

Now, there is introduced a duration (reference total recording duration) Tas for which recording is possible, and which is determined based on the total capacity of the storage medium. For example, in the case of a 4.7 GB capacity (e.g., a DVD), the reference recording rate Rs may be 5 Mbps, and the reference total recording duration Tas may be 2 hours. The reference recording duration may also be regarded as a maximum duration for which it is possible to record program data on an unused storage medium 112 according to a previously determined recording rate.

By using the reference total recording duration Tas, the remaining amount calculation section 115 determines the reference remaining duration TRs in the following manner.

$$TRs = Tas - Trs \quad \text{(eq. 34)}$$

Next, according to the following equation, the remaining amount calculation section 115 calculates the remaining duration TR3 based on the encoding rate Re which is determined by the videorecording time mode.

$$TR3 = TRs \times Rrs/Re$$

For example, assuming that two pieces of recording data have been recorded, and assuming that Tas=2 hours; Tr(1)=1 hour; Tr(2)=1 hour; Rrs=5 Mbps; Rr(1)=2.5 Mbps; Rr(2)=5 Mbps; and Re=2.5 Mbps, it follows that:

$$Trs(1) = 1 \times 2.5/5 = 0.5 \text{ hours};$$

$$Trs(2) = 1 \times 5/5 = 1 \text{ hour};$$

$$Trs = 1.5 \text{ hours};$$

$$TRs = 2 - 1.5 = 0.5 \text{ hours; and}$$

$$TR3 = 0.5 \times 5/2.5 = 1 \text{ hour}.$$

Note that the recording duration Tr and recording rate Rr of each piece of recording data are detected by the recording data detection section 119. The encoding rate Re is determined based on the videorecording time mode.

Remaining amount calculation process (3b):

In the remaining amount calculation process (3b), between a remaining duration TR3c which is determined from the remaining capacity and a remaining duration TR3t which is determined through the same procedure as that of the above-described remaining amount calculation method (3a), the remaining amount calculation section 115 may determine whichever one is smaller as the remaining duration TR3.

$$TR3c = CR/Re \quad \text{(eq. 35)}$$

$$TR3t = TRs \times Rrs/Re \quad \text{(eq. 36)}$$

$$\text{When } TR3c < TR3t, TR3 = TR3c \quad \text{(eq. 37)}$$

When TR3c≧TR3t, TR3=TR3t

This is because, due to scratches or the like applied to the storage medium, defects may occur so as to hinder recording up to the intrinsic total capacity of the storage medium. Thus, since it is no longer possible to perform recording for a duration corresponding to the total recording duration Tas as defined based on the intrinsic total capacity, the remaining amount calculation section 115 determines the remaining duration TR3c which is determined from the remaining capacity to be the remaining duration.

Moreover, in the case where VBR encoding is performed similarly to the remaining amount calculation process (2b), the remaining duration TR3c may be determined in the following manner.

$$TR3c = (CR - M)/Re \quad \text{(eq. 38)}$$

Incidentally, when a VBR encoding is performed, the actually-occurring data rate may become smaller than the target encoding rate. In this case, extra capacity may still be left after performing a recording for the remaining duration as calculated prior to the recording. However, if recording were to be continued until the remaining capacity is depleted, recording for the erased duration could not be guaranteed. Recording for the erased duration being guaranteed means it is guaranteed that a recording can be performed for the same duration as the duration of the erased recording data. For example, in the case where a recording was performed in a given video-recording time mode under the condition that the remaining duration was 1 hour, it may so happen that, because the actually-occurring rate was low, recording was actually possible for 1 hour and 30 minutes by continuing the recording until the remaining capacity was depleted. However, when later this piece of recording data is erased and a record is performed in the same videorecording time mode, a recording of only a 1 hour-worth of program can be guaranteed. This is because it is possible that the actually-occurring rate may increase during the VBR encoding. The reason why recording is guaranteed for the remaining duration is that a variable bit rate control is performed based on the aforementioned VBR margin M. Moreover, a rate control may be performed so as to bring the remaining capacity when the remaining duration has reached zero close to zero, thus minimizing waste of capacity. In other words, the system controller 108 and the like in the data processing apparatus 10 may control the actually-occurring rate through e.g. a feedback control of the quantization parameter in the encoding process by utilizing a difference between the actually-occurring rate and the target encoding rate.

The time-base remaining amount management illustrated in the remaining amount calculation methods (3a) and (3b), where a total recording duration is defined, realizes a guaranteed recording for the erased duration. As a result, there is provided a remaining duration management which is easy for the user to understand.

In the transmission of a digital stream signal, e.g., a BS digital broadcast, the sending end controls the data rate. Therefore, the same Hi-Vision television signal may take different data rates. While it is easy for the user to recognize whether the transmitted stream is a Hi-Vision television signal or a standard television signal, it is difficult for the user to recognize and understand the data rate of the stream. In other words, a guaranteed recording for the erased duration which makes any sense to the user is to guarantee a recording of a standard television signal for the duration of an erased standard television signal.

However, even a standard television signal may take an actual data rate in the range of about 4 to 8 Mbps. Under such a situation where the data rate is controlled by the sending end and the data rate fluctuates, in order to realize a guaranteed recording for the erased duration, it would be necessary for both a 4 Mbps television signal and an 8 Mbps television signal to result in the same recording duration. In this case, the data amount incurred for the recording of the 4 Mbps television signal is half of the data amount of the 8 Mbps television signal, thus resulting in a substantial waste of recording capacity. Therefore, realization of a guaranteed recording for the erased duration may conversely be disadvantageous to the user. Hence, when performing a stream recording, it would be better to perform a capacity-base time management.

Figure 12:
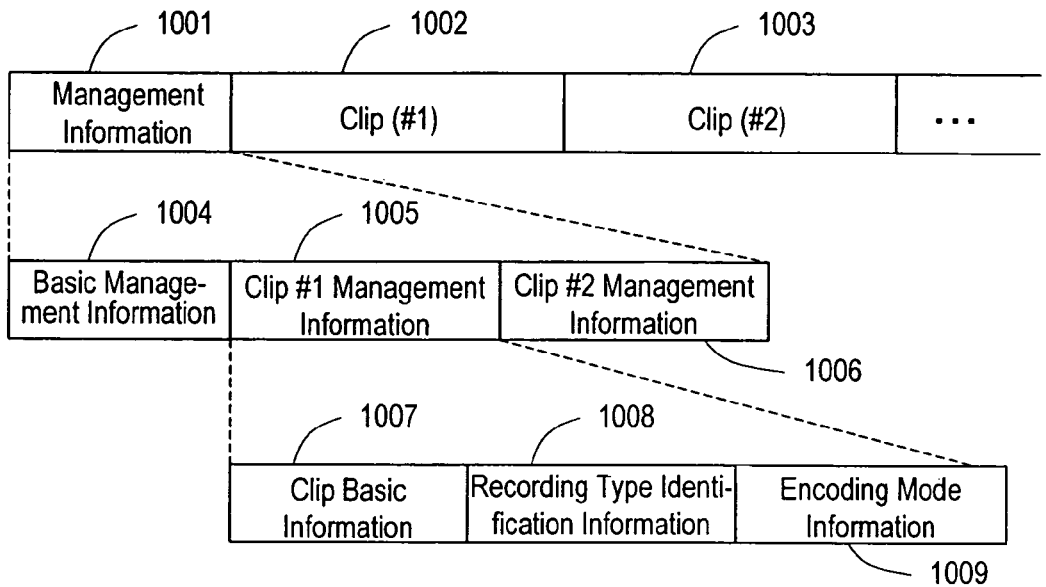
FIG. 12 is a diagram showing a data structure of program data which is recorded onto a storage medium 112 through a recording process by the recording processing section 121.

FIG. 12 shows the data structure of program data which is recorded on the storage medium 112 through the recording process by the recording processing section 121 described above.

On the storage medium 112, management information 1001, a clip (#1) 1002, a clip (#2) 1003, and the like are recorded. Each "clip" represents a unit of videorecording. Each clip is synonymous to a single videorecorded program, and is an encoded stream of the video signal/audio signal of the program. Accordingly, in the storage medium 112 of FIG. 12, at least two programs are videorecorded.

The management information 1001 is management information for reproducing and recording the clips which are recorded on the storage medium 112. The management information 1001 is composed of basic management information 1004 as well as management information 1005 and 1006, which are the management information of clips #1 and #2, respectively. In the basic management information 1004, basic information such as the number of clips which are recorded on the storage medium 112 is recorded. The clip #1 information 1005 is composed of clip basic information 1007, recording type identification information 1008, and encoding mode information 1009. In the clip basic information, basic information such as a recording start address, recording duration, and the like of this clip is recorded. The recording type identification information 1008 is information concerning the so-called videorecording mode, and is information for identifying whether the clip is a stream which has been subjected to a stream recording process. The encoding mode information 1009 is, with respect to a stream which has been subjected to an encoding process and a recording process, information concerning the encoding parameter(s) in that encoding process. The encoding parameter(s) may be, for example, information identifying the bit rate, video resolution, and videorecording time mode in the encoding process.

Thus, by recording the recording type identification information 1008, it is possible to identify whether the data stream of a recorded program has been stream-recorded or not. Moreover, by recording the encoding mode information 1009, it becomes possible to know the parameter(s) in the encoding process of a re-encode recording process or a self-encode recording process, thus making it possible to identify the videorecording time mode.

Alternatively, a signal identifying the recording process which has been selected by the system controller 108 may be recorded on the storage medium 112. The recorded position thereof may be, for example, a region in which to record the management information on the storage medium 112. As a result, it becomes possible to further identify whether a piece of data which is recorded on the storage medium 112 is a direct recording of a digital stream signal which has been transmitted in a BS digital broadcast, or an encoded stream obtained through an encoding by an encoding processing section of a videorecording apparatus.

Figure 13:
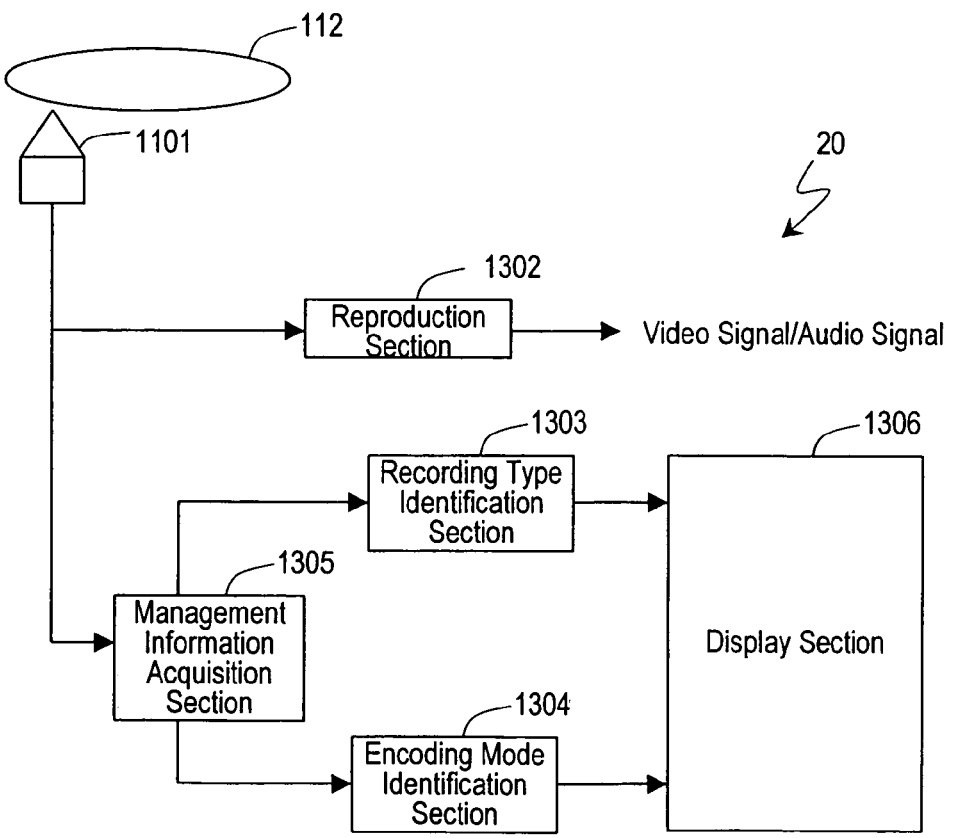
FIG. 13 is a diagram showing the constitution of a data processing apparatus 20 having a reproduction function.

Now, the constitution of an apparatus to reproducing the program data shown in FIG. 12 will be described. FIG. 13 shows the constitution of a data processing apparatus 20 having a reproduction function. The data processing apparatus 20 reads out data from the storage medium 112 and reproduces a video signal/audio signal. In general, an apparatus having a recording function (e.g., an optical disk drive) also has a reproduction function. Therefore, the data processing apparatus 20 may be regarded as those constituent elements of the data processing apparatus 10 of FIG. 1 which are related to a reproduction function.

The data processing apparatus 20 includes a reproduction head 1101, a reproduction section 1302, a recording type identification section 1303, an encoding mode identification section 1304, a management information acquisition section 1305, and a videorecording mode display section 1306.

The video/audio reproduction section 1302 subjects recorded data to a decoding process to reproduce a video signal and an audio signal. In the case where the recording data is a TS, it is first separated into a video stream and an audio stream, and thereafter a decoding process for the video stream and a decoding process for the audio stream are performed. As the decoding process, a decoding process corresponding to the encoding method may be performed; a decoding process may be performed according to the MPEG2 video standard and the MPEG1 audio layer 2 standard.

The management information acquisition section 1305 reads out and acquires the management information which is recorded in a management region of the storage medium, and, from the management information, reads out the recording type identification information and the encoding mode information of the recording data to be reproduced (reproduced data). From the recording type identification information which has been read, the recording type identification section 1303 identifies whether the reproduced data is data which has been subjected to a stream recording process or not. Moreover, the encoding mode identification section 1304 identifies the videorecording time mode from the encoding mode information which has been read.

The display section 1306 displays the type of the recording process. Specifically, the display section 1306 displays whether the reproduced data is a stream-recorded data or not, as well as the videorecording time mode.

An example of the display section 1306 may be display tubes, similarly to the display section 114 of the data processing apparatus 10 (FIG. 5). In the case where the data processing apparatus 20 is included as a part of the data processing apparatus 10 that is related to the reproduction function, the display section 114 operates to display the videorecording mode during videorecording, and display the videorecording mode of the reproduced data during reproduction. Moreover, as will be described later with reference to FIG. 16, if the reproduced data is data which has been subjected to a stream recording process, Stream 501 on the display section 114 is activated for indication; and if the reproduced data is data which has been subjected to a re-encode recording process or a self-encode recording process in the LP mode, LP 502 is activated for indication. Alternatively, as will be described with reference to FIGS. 32 and 33, an indication of the corresponding recording mode is activated. "LP", "SP", and the like in FIGS. 16, 32, 33, and the like represent videorecording modes as determined by the user's selection.

Thus, the constitution and operation of the data processing apparatus 10 according to the present embodiment have been described. Although a plurality of variations of calculation processes have been illustrated with respect to each of the remaining amount calculation processes (1) to (3) in the above description, possible variations are not limited to calculation processes. Therefore, various variations concerning the operation of the data processing apparatus 10 of the present embodiment will be described below.

First, in the procedure of the remaining amount calculation process shown in FIG. 6, the remaining amount calculation process to be executed is determined based only on the recording process type. However, the determination of the remaining amount calculation process to be executed may also be made based on the type of the storage medium 112 and on the recording process type, or based on the type of the storage medium 112 and on the type of the input signal.

Figure 14:
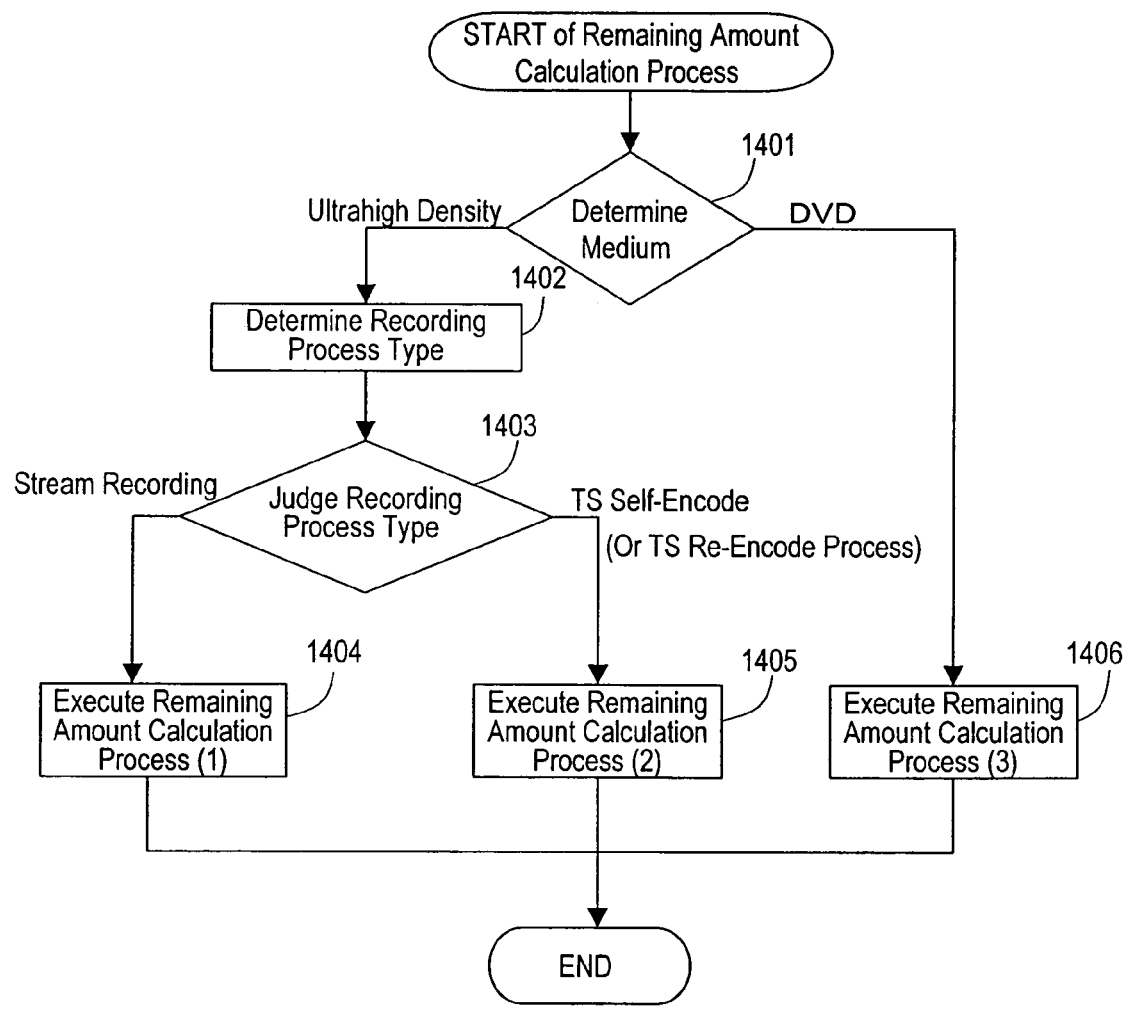
FIG. 14 is a chart showing the procedure of a remaining amount calculation process which is based on the type of the storage medium 112 and on the recording process type.

FIG. 14 shows the procedure of a remaining amount calculation process which is based on the type of the storage medium 112 and on the recording process type. First, at step 1401, the medium determination section 111 determines whether the storage medium 112 is an ultrahigh density RAM medium or a DVD-RAM medium. If the storage medium 112 is an ultrahigh density RAM medium, the system controller 108 proceeds to step 1402. On the other hand, if the storage medium 112 is a DVD-RAM medium, the process proceeds to step 1406, where the remaining amount calculation process (3) is executed. At step 1402, the type of recording process is decided. The types of recording process are the respective processes of: stream recording; TS self-encode recording; and TS re-encode recording. At step 1403, the system controller 108 judges which recording process is to be performed. In the case where a stream recording process is to be performed, the process proceeds to step 1404, where the remaining amount calculation process (1) is executed. In the case where a TS self-encode recording process or a TS re-encode recording is to be performed, the process proceeds to 1405, where the remaining amount calculation process (2) is executed.

Figure 15:
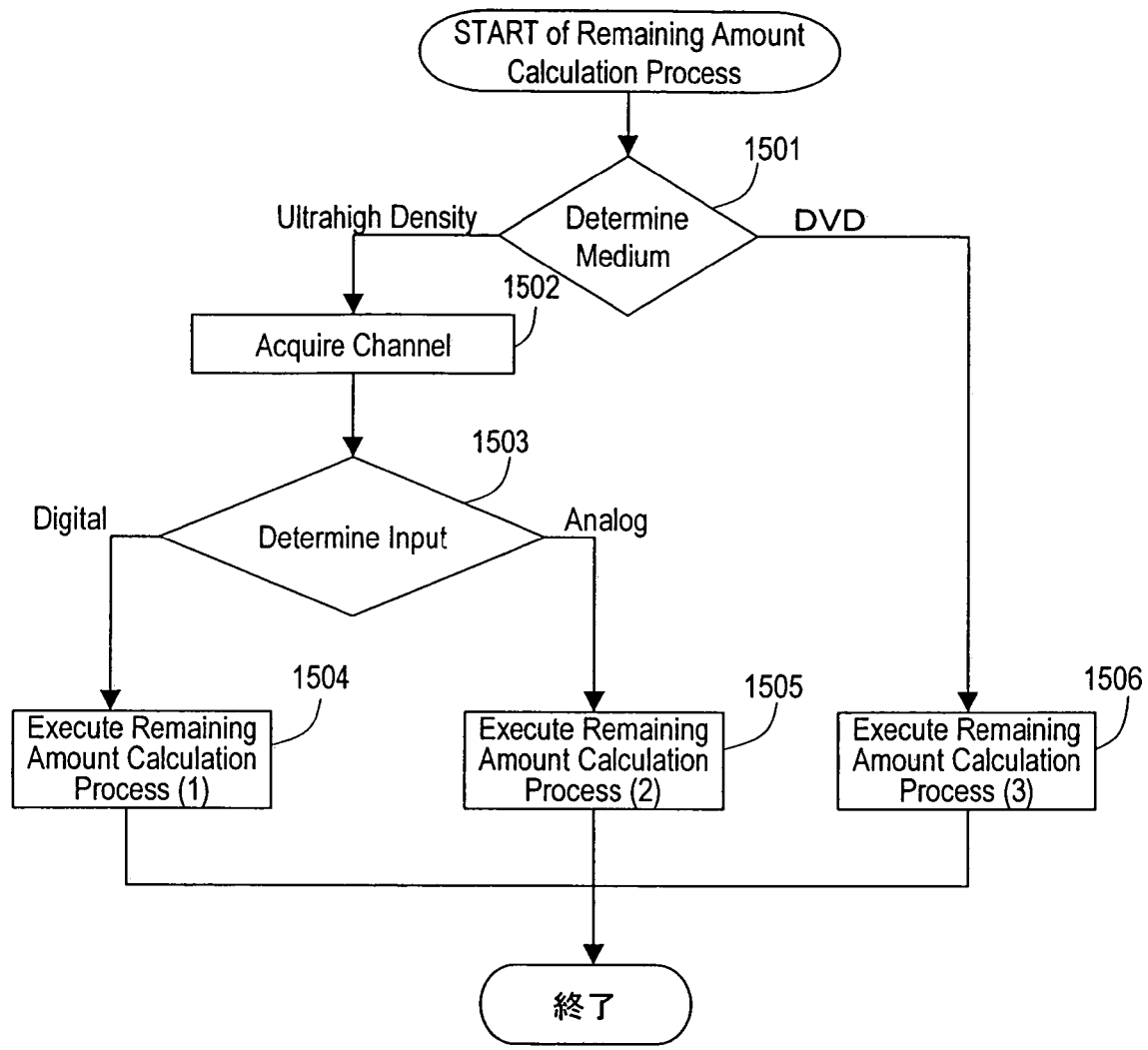
FIG. 15 is a chart showing the procedure of a remaining amount calculation process which is based on the type of the storage medium 112 and on the type of the input signal.

FIG. 15 shows the procedure of a remaining amount calculation process which is based on the type of the storage medium 112 and on the type of the input signal. First, at step 1501, the medium determination section 111 determines whether the storage medium 112 is an ultrahigh density RAM medium or a DVD-RAM medium. If the storage medium 112 is an ultrahigh density RAM medium, the system controller 108 proceeds to step 1502. On the other hand, if the storage medium 112 is a DVD-RAM medium, the process proceeds to step 1506, where the remaining amount calculation process (3) is executed. At step 1502, the system controller 108 acquires the channel which has been set via the channel setting section 109. At step 1503, the system controller 108 determines the input type of the channel which is set. In the case of a digital stream signal, the system controller 108 proceeds to step 1504, where the remaining amount calculation process (1) is executed. In the case of an analog television signal, the system controller 108 proceeds to 1505, where the remaining amount calculation process (2) is executed.

In the two other examples above, in the case where program data is to be recorded on a DVD-RAM medium, a PS self-encode recording or a PS re-encode recording is performed while performing a time-base remaining amount management. In the case where program data is to be recorded on an ultrahigh density RAM medium, a TS recording is performed while performing a capacity-base remaining amount management. The remaining amount managements are associated with the remaining amount calculation processes for the same reasons as those described in connection with FIG. 6.

Thus, by determining the remaining amount calculation process in accordance with the medium type and with the recording process type, or with the medium type and with the type of the input signal, an appropriate and accurate remaining amount calculation can be realized in connection with each recording process. As will be described later, this allows the capacity of the storage medium 112 to be efficiently utilized, thus realizing a remaining amount management which is easy for the user to understand.

Note that, in the case where recording is to be performed on an ultrahigh density RAM medium when a digital stream signal is input, the recording may be performed by decoding the digital stream signal and again performing an encoding process with a predetermined encoding parameter(s). In this case, a TS re-encode recording process will be performed, and the remaining amount calculation process (2) may be selected.

Variations concerning the constitution of the data processing apparatus 10 described above are as follows. Firstly, the data processing apparatus 10 may further comprise a user interface for setting a videorecording time mode. The videorecording time mode is to be reflected on the encoding parameter(s) in the re-encode recording processing section 106 and the self-encode recording process 107.

As the videorecording time mode, for example, a standard-time videorecording (SP) mode and a long-time videorecording (LP) mode may be set. In the case where the LP mode is selected, an encoding process is performed at a lower bit rate than that in the SP mode, in order to enhance the compression rate. Therefore, the system controller 108 inputs an encoding parameter(s) to the video encoders 201 and 305 for controlling them. Note that encoding parameters may also be set for the audio encoders 202 and 307, in accordance with the videorecording time mode.

Moreover, videorecording time modes (encoding parameter(s)) may be separately set for the re-encode recording processing section 106 and the self-encode recording processing section 107. As a result, detailed control by the user becomes possible. Moreover, the videorecording time mode (encoding parameter(s)) of only one of the re-encode recording processing section 106 and the self-encode recording processing section 107 may be set.

Furthermore, information concerning the encoding parameter(s) to be used in the re-encode recording processing section 106 and the self-encode recording processing section 107 may be recorded in a predetermined region of the storage medium 112. The recorded position thereof may be, for example, a region on the storage medium 112 in which management information is recorded. The information concerning the encoding parameter(s) may be a bit rate which is represented as an encoding compression rate, or information identifying videorecording time modes such as LP and SP. By the system controller 108 reading it out from the storage medium, it becomes possible to identify the encoding parameter(s) in an encoding process.

Although two videorecording time modes, i.e., the LP mode and the SP mode, are illustrated in the above example, this is not a limitation. There is no limitation as to the number of modes, e.g., even higher image-quality modes or even longer-time modes.

Moreover, corresponding to the operations of the data processing apparatus 10, details of the current process may be indicated on the display section 114. FIGS. 16(a) to (d) show a display section 114 having a videorecording mode displaying function. The display section 114 comprises three videorecording mode display tubes, which respectively activate Stream 501, LP 502, and SP 503 for indication. FIG. 16(a) shows all of them being activated.

FIG. 16(b) shows "Stream" being activated. This is a state where a stream recording process is to be performed, i.e., a channel for a BS digital broadcast is selected and the program data is recorded on an ultrahigh density medium.

FIG. 16(c) shows "LP" being activated. This is a state where a self-encode recording process or a re-encode recording process is to be performed, where the videorecording time mode is the LP mode. In other words, this is a state where a channel for a terrestrial analog broadcast or a channel for a BS digital broadcast is selected and the program data is recorded on a DVD-RAM medium.

FIG. 16(d) shows "SP" being activated. This is a state where the self-encode recording processing section 107 or the re-encode recording processing section 106 is to perform a recording process, where the videorecording time mode is the SP mode. In other words, this is a state where a channel for a terrestrial analog broadcast or a channel for a BS digital broadcast is selected and the program data is recorded on a DVD-RAM medium.

Figure 16:
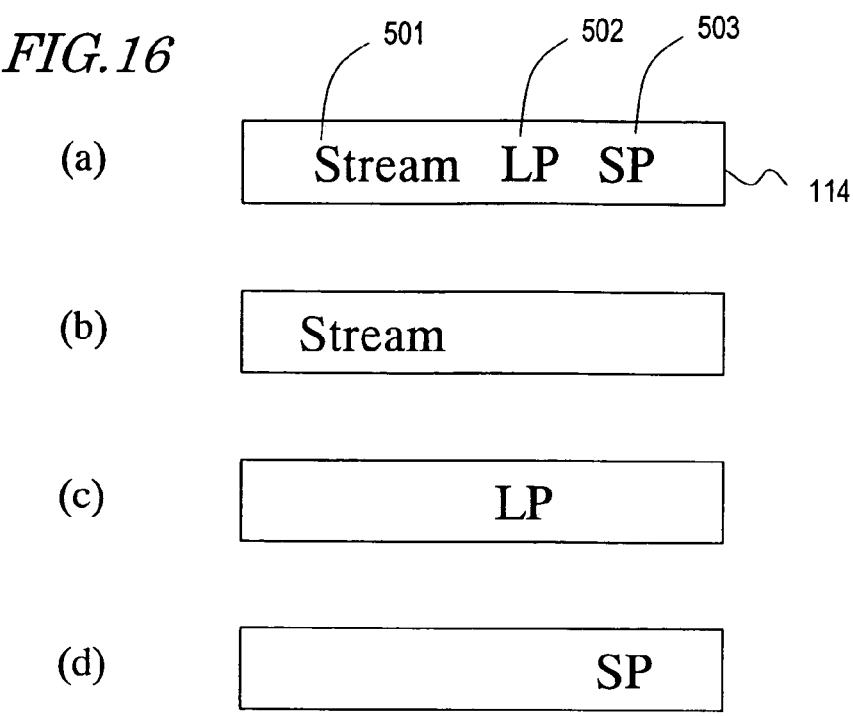
FIG. 16(a) is a diagram showing a display section 114 having a videorecording mode displaying function.
FIGS. 16(b) to (d) are diagrams showing examples of display patterns.

The self-encode recording process and the re-encode recording process are both encoding processes to be performed in the data processing apparatus 10. Therefore, it is important to the user whether a stream recording for directly recording an input signal is being performed or not. Therefore, as shown in FIGS. 16(*b*) to (*d*), by displaying on the display section 114 whether it is a stream recording or not, as well as the videorecording time mode when an encoding process is to be performed, it becomes possible for the user to easily recognize whether it is a stream recording or not, as well as the videorecording mode. The display section 114 is not limited to the above example, but may display information identifying at least one recording process.

Embodiment 2

The data processing apparatus 10 of Embodiment 1 has been illustrated as determining a recording process and performing recording in accordance with the input signal, the type of the loaded storage medium 112, and the like.

In addition to the constitution of the data processing apparatus 10 of Embodiment 1, the data processing apparatus of the present embodiment has a constitution for performing a recording process in a videorecording mode which is set by the user himself or herself. As used herein, a "videorecording mode" refers to the type of a recording process, i.e., an auto mode recording process or an manual mode recording process. The auto mode recording process is identical to the process of the data processing apparatus of Embodiment 1. The manual mode recording process is to be set when the user desires to perform a videorecording while giving precedence to either the videorecording duration, video image quality, or the like, for example.

Hereinafter, the constitution and operation of the data processing apparatus of the present embodiment will be described. The data processing apparatus of the present embodiment has the same constitution as the constitution of the data processing apparatus 10 shown in FIG. 1. Therefore, those portions of the constitution and operation which differ from the data processing apparatus 10 of Embodiment 1 will be described.

Figure 17:
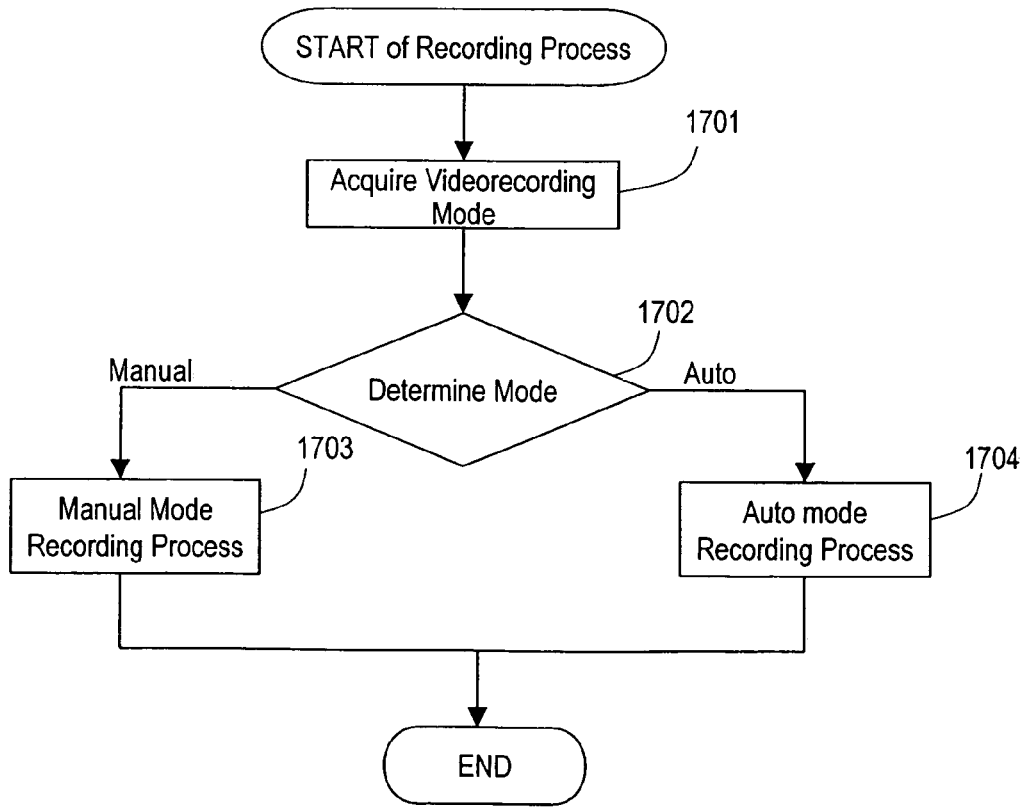
FIG. 17 is a flowchart showing a mode determining procedure for the data processing apparatus 10 according to the present embodiment.

FIG. 17 is a flowchart showing a mode determining procedure of the data processing apparatus 10 according to the present embodiment. The data processing apparatus 10 according to the present embodiment has two types of recording processes (an auto mode recording process and a manual mode recording process). The switching between the auto mode and the manual mode is made by the user at the videorecording mode setting section 123, for example. In other words, at the videorecording mode setting section 123, it is possible to set the manual mode, and make the setting as to which one of the videorecording duration, the video image quality, and the like is to be given precedence when performing a videorecording. Regardless of whether the mode is the auto mode or the manual mode, a selection is made from a plurality of types of recording methods, when performing a recording process for a DVD-RAM medium and an ultrahigh density RAM medium for inputs of an analog television signal and a digital stream signal.

First, at step 1701, the system controller 108 acquires a videorecording mode which is selected. At step 1702, the system controller 108 determines the videorecording mode. Specifically, if a videorecording mode has not been set via the videorecording mode setting section 123, the system controller 108 recognizes the auto mode and proceeds to step 1704; if a videorecording mode has been set, the system controller 108 recognizes the manual mode and proceeds to step 1703. At step 1703, a manual mode recording process is performed. Step 1704 is a step at which an auto mode recording process is performed.

The recording processing section 121 performs a recording process which is in accordance with either the auto mode or the manual mode. Hereinafter, with respect to each mode, the signal recording processes when a digital stream signal and an analog television signal are input will be described. Note that the relationship between a selection process and a recording process related to the following descriptions is as described in the control table 419 in the table memory 122.

FIG. 18 shows an exemplary control table 419. As is clear from the control table 419, in both the auto mode recording process and the manual mode recording process, the type of recording process is determined in accordance with the input signal and the medium type. The system controller 108 may give instructions to the respective constituent elements in accordance with the control table 419, or may output instructions for realizing the below-described processes without providing such a table. The auto mode in FIG. 18 has the same details as those shown in FIG. 4, and its specific processing procedure is as shown in FIG. 7. Therefore, the description of the auto mode is omitted. Regardless of whether the mode is the auto mode or the manual mode, a remaining amount calculation process (1) to (3) corresponding to the determined recording process is uniquely determined, and is capable of displaying the remaining duration and the like. For example, as shown in FIG. 4, regardless of whether the mode is the auto mode or the manual mode, the stream recording process is associated with the remaining amount calculation process (1); the TS self-encode recording process is associated with the remaining amount calculation process (2); and the PS re-encode recording process and the PS self-encode process are associated with the remaining amount calculation process (3) for execution. The particulars of the remaining amount calculation processes (1) to (3) have been described in connection with Embodiment 1, and the descriptions thereof are omitted.

Figure 19:
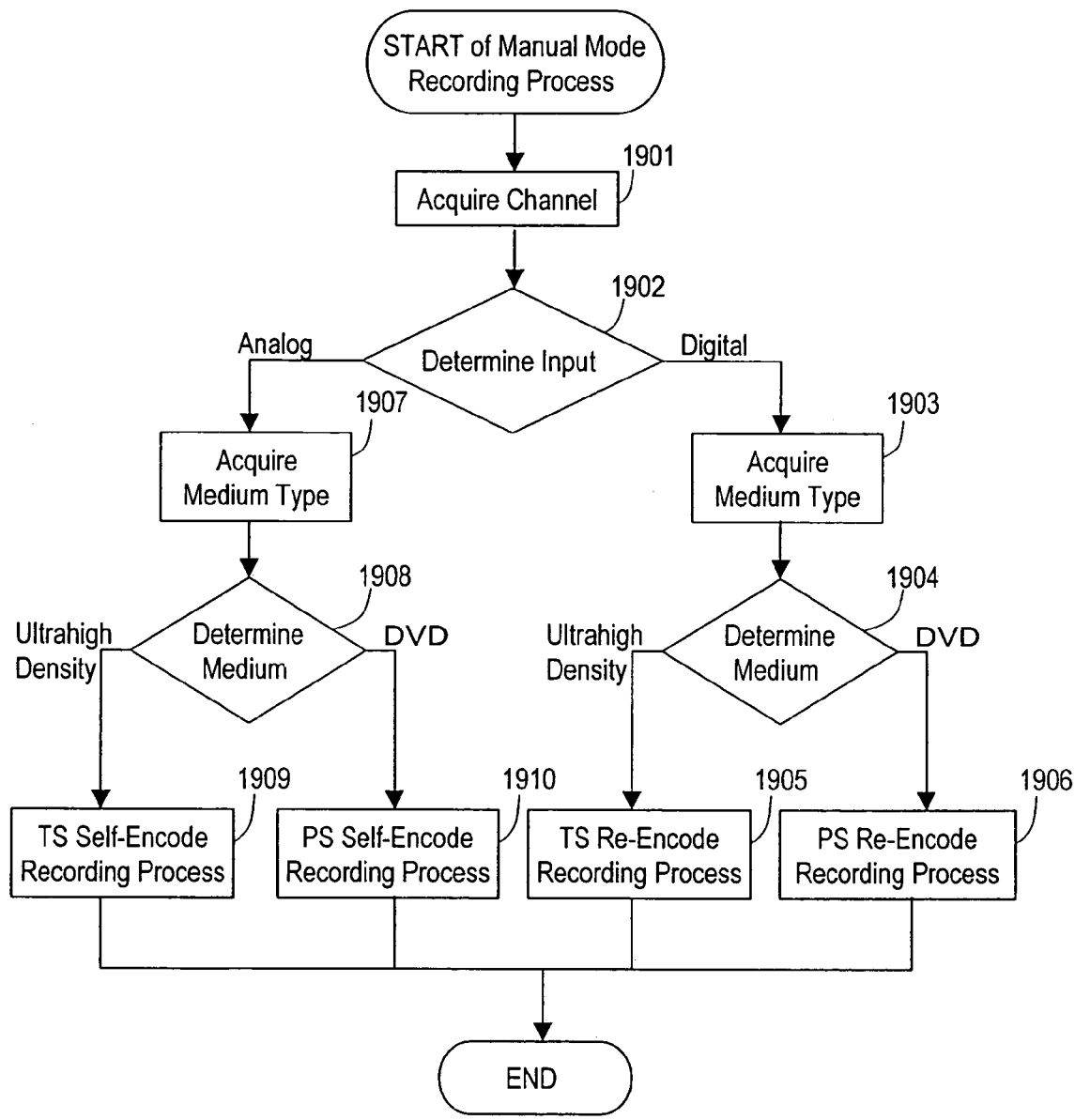
FIG. 19 is a chart showing a recording process determining procedure in a manual mode recording process.

FIG. 19 shows a recording process determining procedure in the manual mode recording process. At step 1901, the system controller 108 acquires the input channel information as selected by the user. At step 1902, the system controller 108 determines the type of the input signal. If the input signal is an analog television signal, the process proceeds to step 1907; if the input signal is the digital stream signal, the process proceeds to step 1903. At step 1903, the system controller 108 acquires the type of the storage medium for which a recording process is currently to be performed. At the next step 1904, the system controller 108 determines the type of the storage medium. In the case of a DVD-RAM medium, the process proceeds to step 1906. In the case of an ultrahigh density RAM medium, the process proceeds to step 1905. At step 1905, the input digital signal is re-encoded into a TS, and recorded onto an ultrahigh density medium. On the other hand, at step 1906, the system controller 108 re-encodes the input digital signal into a PS, and records it onto a DVD-RAM medium.

At step 1907, the system controller 108 acquires the type of the storage medium for which a recording process is currently to be performed. At step 1908, the type of the storage medium is determined. In the case of a DVD-RAM medium, the process proceeds to step 1910. In the case of an ultrahigh density RAM medium, the process proceeds to step 1909. At step 1909, the input analog signal is self-encoded into a TS, and recorded onto an ultrahigh density medium. On the other hand, at step 1910, the system controller 108 self-encodes the input analog signal into a PS, and records it onto a DVD-RAM medium.

In the encoding process in the re-encode recording process or the self-encode recording process, the encoding parameter(s) may be varied to introduce a plurality of modes concerning videorecording duration, e.g., a long-time videorecording mode or a standard-time videorecording mode.

In the auto mode, the user only selects a channel on which to perform a videorecording, whereby a recording process which is suitable for the input signal and the storage medium is performed. In the auto mode, in the case of performing a stream recording process (where an input digital stream signal is directly recorded), the data amount of the incoming stream is controlled by the sending end. Therefore, when performing a recording on a storage medium having little vacant capacity, it is possible that all of the programs to be videorecorded may not be videorecorded.

On the other hand, in the manual mode, it is possible to perform a recording in a videorecording time mode which conforms to the user's intention. In the manual mode, an encoding process will always be performed, so that it is possible to control the data amount of the encoded stream to be recorded. Therefore, it is possible to perform a videorecording which is in accordance with the vacant capacity; e.g., when the vacant capacity is low, videorecording may be performed in the long-time videorecording mode to prolong the videorecording duration.

Thus, by providing the auto mode and the manual mode, it becomes possible to realize a highly convenient videorecording process which more flexibly suits the user's preferences.

Furthermore, during a recording process, by indicating which one of the auto mode and manual modes has been selected and what sort of recording process is to be performed, the user's convenience is further enhanced. FIGS. 20(*a*) to (*c*) show examples of display patterns on a display section 114 having a videorecording mode displaying function. The display section 114 comprises two videorecording mode display tubes, which are activated to indicate "Auto" and "Stream", respectively.

FIG. 20(*a*) shows "Auto" and "Stream" being activated. This is a state where the auto mode is selected and a stream recording process is to be performed. In other words, this is a state where a digital stream signal is input and the program data is recorded onto an ultrahigh density medium. FIG. 20(*b*) shows only "Auto" being activated. This is a state where the auto mode is selected and a re-encode recording process or a self-encode recording process is to be performed. In other words, this is a state where a digital stream signal is input and the program data is recorded onto a DVD-RAM medium, or where an analog television signal is input. FIG. 20(*c*) shows the display tubes of the display section 114 not being activated. This is state where the manual mode has been selected. With this constitution, the user is able to recognize the videorecording mode and recording process which are selected.

Hereinafter, the contents to be displayed on the display section 114 will be described with specific references to the auto mode/manual mode setting in the data processing apparatus 10, the recording rate, the type of the storage medium 112, and the like.

First, the specific details of the "auto mode" and the "manual mode" discussed below will be described. Firstly, the "auto mode" is classified into: a stream recording when a digital stream signal is recorded on an ultrahigh density medium (BD); and a self-encode recording/re-encode recording, which is performed in the SP mode when an analog signal is input or when a digital stream signal is recorded onto a DVD-RAM medium. The switching between the stream recording and the self-encode recording/re-encode recording is automatically made in the processing by the data processing apparatus 10. During a self-encode recording/re-encode recording, the videorecording time mode is fixed to the SP mode.

On the other hand, in the "manual mode", four videorecording time modes, i.e., the LP mode, the SP mode, the XP mode, or the B-XP mode, are set by the user. Note that, when the B-XP mode is set while a DVD-RAM medium is loaded, the videorecording is to be performed in the XP mode.

Figure 21:
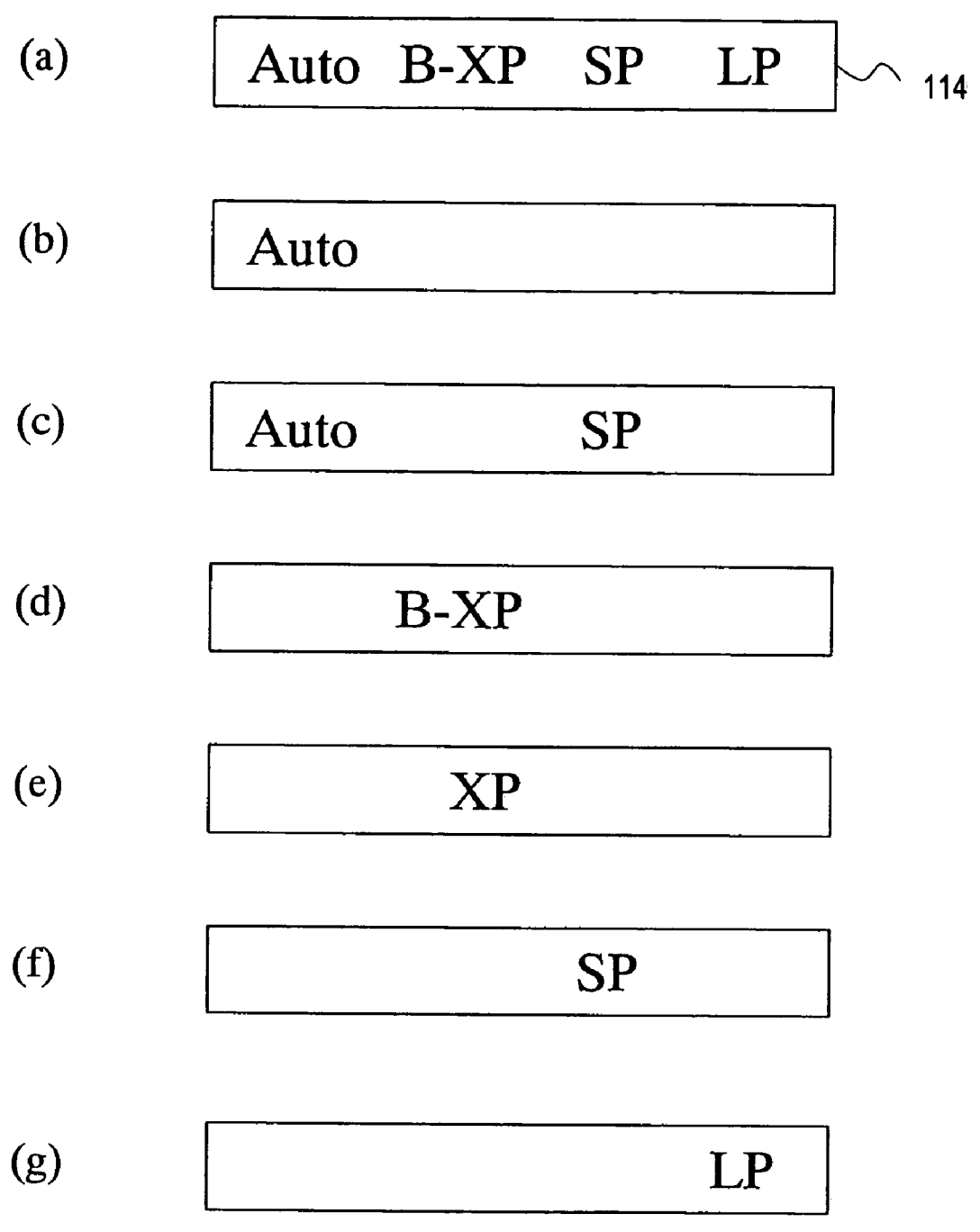

FIG. 21(*a*) shows examples of display tubes in the display section 114. The display section 114 is generally divided into four display tubes "Auto", "B-XP", "SP", and "LP". FIGS. 21(*b*) to (*g*) show possible display states to be taken. FIG. 21(*b*) shows a display state when the auto mode is set. FIG. 21(*c*) shows a display state when the auto mode is set and a self-encode recording process is being performed. FIG. 21(*d*) shows a state where the BXP mode is set. FIG. 21(*e*) shows a state where the XP mode is set. FIG. 21(*f*) shows a state where the SP mode is set. FIG. 21(*g*) shows a state where the LP mode is set.

Hereinafter, for ease of understanding, the relationship between the processes which are performed in the respective display states will be described on the basis of control tables 419. Each control table 419 shows a correspondence between: the type of the storage medium 112 which is loaded; the type of the input signal (input source); the type of the remaining amount calculation adopted; and the recording rate used for the remaining amount calculation.

FIG. 22 shows the control table 419 when the auto mode is set. During a videorecording process under this mode, the display section 114 performs display as shown in FIG. 21(*b*). If the input digital stream signal is an HD signal, an HD broadcast is recognized, and a remaining amount calculation process is performed with a recording rate of 24 Mbps. If the input digital stream signal is an SD signal, an SD broadcast is recognized, and a remaining amount calculation process is performed with a recording rate of 12 Mbps. If it is impossible to detect whether the input digital stream signal is an HD signal or an SD signal, a remaining amount calculation process is performed with a recording rate of 24 Mbps.

On the other hand, if the storage medium is a DVD and the input source is an analog signal, a self-encode recording process is performed. In this case, the display section 114 performs display as shown in FIG. 21(*c*).

FIG. 23 shows the control table 419 when the BXP mode is set. During a videorecording process under this mode, the display section 114 performs display as shown in FIG. 21(*d*). If the storage medium 112 is a BD, the program is videorecorded under the "BXP" mode with a recording rate of 15 Mbps.

However, if the storage medium 112 is a DVD, the program is videorecorded under the XP mode at 10 Mbps. The reason is that, according to the DVD standard, the maximum recording rate is limited to 10 Mbps. Note that the display section 114 displays "XP" (FIG. 21(*e*)) while a DVD is loaded.

FIG. 24 shows the control table 419 when the XP mode is set. During a videorecording process under this mode, the display section 114 performs display as shown in FIG. 21(*e*).

FIG. 25 shows the control table 419 when the SP mode is set. During a videorecording process under this mode, the display section 114 performs display as shown in FIG. 21(*f*).

FIG. 26 shows the control table 419 when the LP mode is set. During a videorecording process under this mode, the display section 114 performs display as shown in FIG. 21(g).

The relationship between each mode and the display pattern on the display section 114 is shown in FIG. 27 to FIG. 31. FIG. 27 shows a display pattern on the display section 114 when the auto mode is set, the display pattern being in accordance with the type of the storage medium 112, the type of the input source, and the like. FIG. 28 shows a display pattern on the display section 114 when the BXP mode is set, the display pattern being in accordance with the type of the storage medium 112, the type of the input source, and the like. FIG. 29 shows a display pattern on the display section 114 when the XP mode is set, the display pattern being in accordance with the type of the storage medium 112, the type of the input source, and the like. FIG. 30 shows a display pattern on the display section 114 when the SP mode is set, the display pattern being in accordance with the type of the storage medium 112, the type of the input source, and the like. FIG. 31 shows a display pattern on the display section 114 when the LP mode is set, the display pattern being in accordance with the type of the storage medium 112, the type of the input source, and the like. In FIG. 27 to FIG. 31, a display pattern when "reproducing" is meant as an indication to be made when data which has been videorecorded under that condition is reproduced.

The indications on the display section 114 may be simplified. This point will be described with reference to FIGS. 32(a) to (f) and FIG. 33.

First, specific details of the "auto mode" and the "manual mode" which will be discussed in connection with FIG. 32 and FIG. 33 will be described. The definition of "auto mode" is generally similar to the aforementioned definition of "auto mode", except for the following difference: the videorecording time mode in a self-encode recording/re-encode recording is the SP mode or the LP mode, either one of which is set by the user. On the other hand, in the "manual mode", the videorecording time mode is the SP mode or the LP mode, either one of which is set by the user. Note that the user is able to set either the SP mode or the LP mode, independently for each of the "auto mode" and the "manual mode".

FIG. 32(a) shows examples of text characters which can be displayed on the display section 114. The display section 114 only displays "Auto", "LP", and "SP".

FIG. 32(b) shows only "Auto" being activated. This indicates that a recording process is performed by the stream recording processing section 105. In the aforementioned example, "Auto" alone is activated when a channel for a BS digital broadcast is set, and a signal recording for an ultrahigh density medium is performed.

FIG. 32(c) shows "Auto" and "LP" being activated. This indicates that a self-encode recording process or a re-encode recording process is performed in the LP mode.

FIG. 32(d) shows "Auto" and "SP" being activated. This indicates that the auto mode is selected, and a self-encode recording process or a re-encode recording process is performed in the SP mode.

FIG. 32(e) shows "LP" being activated. This indicates that the manual mode is selected, and that a self-encode recording process or a re-encode recording process is performed in the LP mode.

FIG. 32(f) shows "SP" being activated. This indicates that the manual mode is selected, and that a self-encode recording process or a re-encode recording process is performed in the SP mode.

With this constitution, it is possible for the user to recognize the videorecording mode, the recording process, and the videorecording time mode that are selected.

In a variant of the display pattern shown in FIG. 32, the stream recording process may additionally be displayed, from the perspective of enhancing the user's convenience. FIG. 33(a) shows examples of text characters which can be displayed on the display section 114. As compared with FIG. 32(a), there is a difference in that the display section 114 shown in FIG. 33(a) includes a "Stream" indication.

FIG. 33(b) shows "Auto" and "Stream" 902 being activated. This indicates that the auto mode is selected, and that a stream recording process is performed.

FIG. 33(c) shows "Auto" and "LP" being activated. This indicates that the auto mode is selected, and that a self-encode recording process or a re-encode recording process is performed in the LP mode.

FIG. 33(d) shows "Auto" and "SP" being activated. This indicates that the auto mode is selected, and that a self-encode recording process or a re-encode recording process is performed in the SP mode.

FIG. 33(e) shows the "LP" being activated. This indicates that the manual mode is selected, and that a self-encode recording process or a re-encode recording process is performed in the LP mode.

FIG. 33(f) shows the "SP" being activated. This indicates that the manual mode is selected, and that a self-encode recording process or a re-encode recording process is performed in the SP mode.

With this constitution, it is possible for the user to recognize the videorecording mode, the recording process, and the videorecording time mode that are selected.

It has been illustrated that the data processing apparatus 10 handles the manual/auto setting and the videorecording mode selection in the videorecording mode setting section 123. However, these may be unified. For example, a videorecording mode button may be provided, and cyclic settings may be made possible with each pressing of the videorecording mode button, e.g., auto →LP→SP→auto. If auto is selected, the auto mode is set. If LP or SP is selected, it is considered that the manual mode is selected, and the LP or SP mode is selected as the videorecording time mode.

The auto videorecording time mode setting user interface 601 may be omitted. In this case, the videorecording time mode in the re-encode recording process or the self-encode recording process under the auto mode is previously fixed in the apparatus. As a result, the auto mode can be made into a simpler videorecording mode.

Thus, embodiments of the present invention have been described. Although various examples were illustrated in the description of each embodiment, the present invention is applicable without being limited thereto.

For example, unlike in the embodiments, as for the input signal to the data processing apparatus 10, a digital stream signal may be a Cs digital broadcast signal, or a signal which is transmitted via a digital interface such as iLink. Moreover, the input signal may be a signal from a digital camcorder. Moreover, DV data of a consumer-use digital camcorder may similarly be treated as a digital stream signal. In this case, input is given from a DV terminal, and the DV terminal may be allocated as one channel. A stream recording process of directly recording DV data or a re-encode recording process is selected in accordance with the storage medium. In the case of a DVD-RAM medium, a re-encode recording process is performed; and in the case of an ultrahigh density RAM medium, a stream recording process is performed, for example.

The input signal may be of two types, i.e., an uncompressed digital signal and a compressed digital signal. In the case of an uncompressed digital signal, a recording process may be selected similarly to the case of an analog signal as illustrated in the examples. This is because, in the case of an analog signal, it is subjected to a digital conversion process in the encoding process so as to be treated as an uncompressed digital signal. Furthermore, there may be three or more signal types.

The types of storage media are only exemplary. A DVD-R, DVD-RW, DVD+R, DVD+RW, CD-R, CD-RW, or any other optical disk medium may be used. Alternatively, a semiconductor memory, a magnetic storage medium or the like may be used, and their types may be arbitrary so long as there are two or more types.

Furthermore, the types of encoding methods to be performed in a recording process are only exemplary, too; they may conform to other encoding methods such as MPEG4, and the number of their types may be arbitrary so long as there are two or more types.

The functions of the data processing apparatus in each of the above-described embodiments may be realized by executing software. For example, the operation of each constituent element may be controlled by the system controller 108 executing a computer program. The computer program may be constructed so as to perform processes in accordance with the flowcharts shown in FIGS. 6 to 8, 11, and 15, for example.

The computer program may be recorded on a storage medium, such as: an optical storage medium, e.g., an optical disk; a semiconductor storage medium, e.g., an SD memory card or an EEPROM; or a magnetic storage medium, e.g., a flexible disk. Note that the data processing apparatus 10 can acquire the computer program not only via a storage medium, but also via electric communications lines, e.g., the Internet.

INDUSTRIAL APPLICABILITY

According to the present invention, there is provided a data processing apparatus or the like which is capable of determining a recording method based on the type of an input signal and the type of a storage medium, and determining a remaining amount calculation method which is in accordance with the recording method and calculating a remaining duration. Since the remaining amount calculation method differs depending on the recording method, it is possible to calculate the remaining duration in a more appropriate and accurate manner. As a result, the user can recognize the calculated remaining duration via display tubes or the like, and the user's convenience is highly enhanced.

The invention claimed is:

1. A data processing apparatus capable of writing and/or reading program data from or to a plurality of types of storage media, comprising:
 a receiving section configured to receive an external broadcast signal concerning program data;
 a determination section configured to determine a type of a storage medium having been loaded;
 a recording processing section configured to record program data obtained from the signal onto the storage medium, via one of the processes of: a stream recording process, in which the program data is neither decoded nor encoded; and an encode recording process, in which the program data is at least encoded;
 a selection section configured to select one of the stream recording process and the encode recording process in accordance with the type of the storage medium;
 a data rate detector configured to detect a transmission rate of the external broadcast signal of the program data, wherein the transmission rate may fluctuate;
 a calculation section configured to calculate, in accordance with the selected recording process, a remaining duration for which it is possible to perform recording on the storage medium by selecting one of: a first remaining amount calculation process that calculates the remaining duration based on a remaining capacity of the storage medium and on the fluctuating transmission rate of the program data detected by the data rate detector; and a second remaining amount calculation process that calculates the remaining duration based on a fluctuating encoding rate; and
 a display section configured to display the calculated remaining duration; wherein
 the storage media are differentiated in type depending on recording capacity;
 the receiving section receives one of the signals of an external broadcast digital signal and an external broadcast analog signal;
 the recording processing section selects the encode recording process for any storage medium having a recording capacity equal to or less than a predetermined reference capacity; and
 the calculation section selects a second remaining amount calculation process.

2. The data processing apparatus of claim 1, wherein,
 the encode recording process includes a first encode recording process of subjecting the program data to a decoding and thereafter an encoding process, and a second encode recording process of subjecting the program data to an encoding process;
 the recording processing section selects the first encode recording process when the receiving section receives the digital signal, and selects the second encode recording process when the receiving section receives the analog signal; and
 the calculation section calculates the remaining duration by performing the second remaining amount calculation process based further on a recorded duration representing an amount of time for which a recording process has been performed and on a recording rate.

3. The data processing apparatus of claim 2, further comprising a memory for storing a reference recording duration, the reference recording duration representing a maximum duration for which the program data can be recorded on the unused storage medium, wherein,
 the calculation section calculates a reference recorded duration by normalizing the recorded duration with the recording rate, determines a reference remaining duration by subtracting the reference recorded duration from the reference recording duration stored in the memory, and calculates the remaining duration based on the reference remaining duration and on the encoding rate.

4. The data processing apparatus of claim 1, wherein,
 the storage media are differentiated in type depending on recording capacity;
 the receiving section receives a digital signal;
 the recording processing section selects the stream recording process for any storage medium having a recording capacity equal to or greater than a predetermined reference capacity; and
 the calculation section selects the first remaining amount calculation process.

5. The data processing apparatus of claim 4, wherein the signal includes program information specifying a transmission rate and a broadcasting duration of the program data,
the data processing apparatus further comprising a controller configured to extract the program information from the received signal,
wherein the calculation section calculates the remaining duration based on the extracted transmission rate and broadcasting duration.

6. The data processing apparatus of claim 5, wherein the calculation section
calculates a data amount of each of one or more program data based on the transmission rate and broadcasting duration,
determines a cumulative data amount obtained by cumulatively adding each data amount until exceeding the remaining capacity, and determining a cumulative broadcasting duration obtained by cumulatively adding each broadcasting duration corresponding to the added data amount, and
determines the remaining duration by subtracting a broadcasting duration corresponding to any data amount exceeding the remaining capacity from the cumulative broadcasting duration.

7. The data processing apparatus of claim 1, wherein,
the storage media are differentiated in type depending on recording capacity;
the receiving section receives an analog signal;
the recording processing section selects the encode recording process for any storage medium having a recording capacity equal to or greater than a predetermined reference capacity; and
the calculation section calculates the remaining duration by performing the second remaining amount calculation process based further on the remaining capacity of the storage medium.

8. The data processing apparatus of claim 1, wherein the display section further displays information identifying the recording process selected by the selection section.

9. The data processing apparatus of claim 8, wherein the display section displays at least one of the encoding rate, a resolution, and a frequency if the encode recording process is selected by the selection section.

10. A data processing method of writing and/or reading program data from or to a plurality of types of storage media, comprising the steps of
receiving an external broadcast signal concerning program data;
determining a type of a storage medium having been loaded;
recording program data obtained from the signal onto the storage medium, via one of the processes of: a stream recording process, in which the program data is neither decoded nor encoded; and an encode recording process, in which the program data is at least encoded;
selecting one of the stream recording process and the encode recording process in accordance with a type of the storage medium;
detecting a transmission rate of the external broadcast signal of the program data, wherein the transmission rate may fluctuate;
in accordance with the selected recording process, calculating a remaining duration for which it is possible to perform recording on the storage medium by selecting one of: a first remaining amount calculation process that calculates the remaining duration based on a remaining capacity of the storage medium and on the detected fluctuating transmission rate of the program data; and a second remaining amount calculation process that calculates the remaining duration based on a fluctuating encoding rate; and
displaying the calculated remaining duration; wherein
the storage media are differentiated in type depending on recording capacity;
the receiving step receives one of the signals of an external broadcast digital signal and an external broadcast analog signal;
the recording step selects the encode recording process for any storage medium having a recording capacity equal to or less than a predetermined reference capacity; and
the calculating step selects a second remaining amount calculation process.

11. The data processing method of claim 10, wherein,
the encode recording process includes a first encode recording process of subjecting the program data to a decoding and thereafter an encoding process and a second encode recording process of subjecting the program data to an encoding process;
the recording step selects the first encode recording process when the receiving step receives the digital signal, and selects the second encode recording process when the receiving step receives the analog signal; and
the calculating step calculates the remaining duration by performing the second remaining amount calculation process based further on a recording rate and on a recorded duration representing an amount of time for which a recording process has been performed.

12. The data processing method of claim 11, further comprising a step of storing a reference recording duration, the reference recording duration representing a maximum duration for which the program data can be recorded on the unused storage medium, wherein,
the calculating step calculates a reference recorded duration by normalizing the recorded duration with the recording rate, determines a reference remaining duration by subtracting the reference recorded duration from the reference recording duration stored in the memory, and calculates the remaining duration based on the reference remaining duration and on the encoding rate.

13. The data processing method of claim 10, wherein,
the storage media are differentiated in type depending on recording capacity;
the receiving step receives a digital signal;
the recording step selects the stream recording process for any storage medium having a recording capacity equal to or greater than a predetermined reference capacity; and
the calculating step selects the first remaining amount calculation process.

14. The data processing method of claim 13, wherein the signal includes program information specifying a transmission rate and a broadcasting duration of the program data,
the data processing method further comprising a step of extracting the program information from the received signal,
wherein the calculating step calculates the remaining duration based on the extracted transmission rate and broadcasting duration.

15. The data processing method of claim 14, wherein the calculating step
calculates a data amount of each of one or more program data based on the transmission rate and broadcasting duration, determines a cumulative data amount obtained by cumulatively adding each data amount until exceeding the remaining capacity, and determining a cumulative broadcasting duration obtained by cumulatively adding each broadcasting duration corresponding to the added data amount, and determines the remaining duration by subtracting a broadcasting duration corresponding to any data amount exceeding the remaining capacity from the cumulative broadcasting duration.

16. The data processing method of claim 10, wherein, the storage media are differentiated in type depending on recording capacity;

the receiving step receives an analog signal;

the recording step selects the encode recording process for any storage medium having a recording capacity equal to or greater than a predetermined reference capacity; and the calculating step calculates the remaining duration by performing the second remaining amount calculation process based further on the remaining capacity of the storage medium.

17. The data processing method of claim 10, wherein the displaying step further displays information identifying the recording process selected by the selecting step.

18. The data processing method of claim 17, wherein the displaying step displays at least one of the encoding rate, a resolution, and a frequency if the encode recording process is selected by the selecting step.

19. A non-transitory computer-readable medium storing a computer program which when executed by a computer in a data processing apparatus for writing and/or reading program data from or to a plurality of types of storage media, performs the steps of:

receiving an external broadcast signal concerning program data;

determining a type of a storage medium having been loaded;

recording program data obtained from the signal onto the storage medium, via one of the processes of: a stream recording process, in which the program data is neither decoded nor encoded; and an encode recording process, in which the program data is at least encoded;

selecting one of the stream recording process and the encode recording process in accordance with a type of the storage medium;

detecting a transmission rate of the external broadcast of the program data, wherein the transmission rate may fluctuate;

in accordance with the selected recording process, calculating a remaining duration for which it is possible to perform recording on the storage medium by selecting one of: a first remaining amount calculation process that calculates the remaining duration based on a remaining capacity of the storage medium and on the detected fluctuating transmission rate of the program data; and a second remaining amount calculation process that calculates the remaining duration based on a fluctuating encoding rate; and displaying the calculated remaining duration; wherein the storage media are differentiated in type depending on recording capacity;

the receiving step receives one of the signals of an external broadcast digital signal and an external broadcast analog signal;

the recording step selects the encode recording process for any storage medium having a recording capacity equal to or less than a predetermined reference capacity; and the calculating step selects a second remaining amount calculation process.

20. The non-transitory computer-readable medium of claim 19, wherein, the storage media are differentiated in type depending on recording capacity;

the receiving step receives a digital signal;

the recording step selects the stream recording process for any storage medium having a recording capacity equal to or greater than a predetermined reference capacity; and the calculating step selects the first remaining amount calculation process.

21. The non-transitory computer-readable medium of claim 19, wherein, the storage media are differentiated in type depending on recording capacity;

the receiving step receives an analog signal;

the recording step selects the encode recording process for any storage medium having a recording capacity equal to or greater than a predetermined reference capacity; and the calculating step calculates the remaining duration by performing the second remaining amount calculation process based further on the remaining capacity of the storage medium.

22. The non-transitory computer-readable medium of claim 19, wherein the displaying step further displays information identifying the recording process selected by the selecting step.

* * * * *